May 22, 1945.  C. H. WHITE  2,376,464
PLANTER
Filed March 31, 1941  7 Sheets-Sheet 2
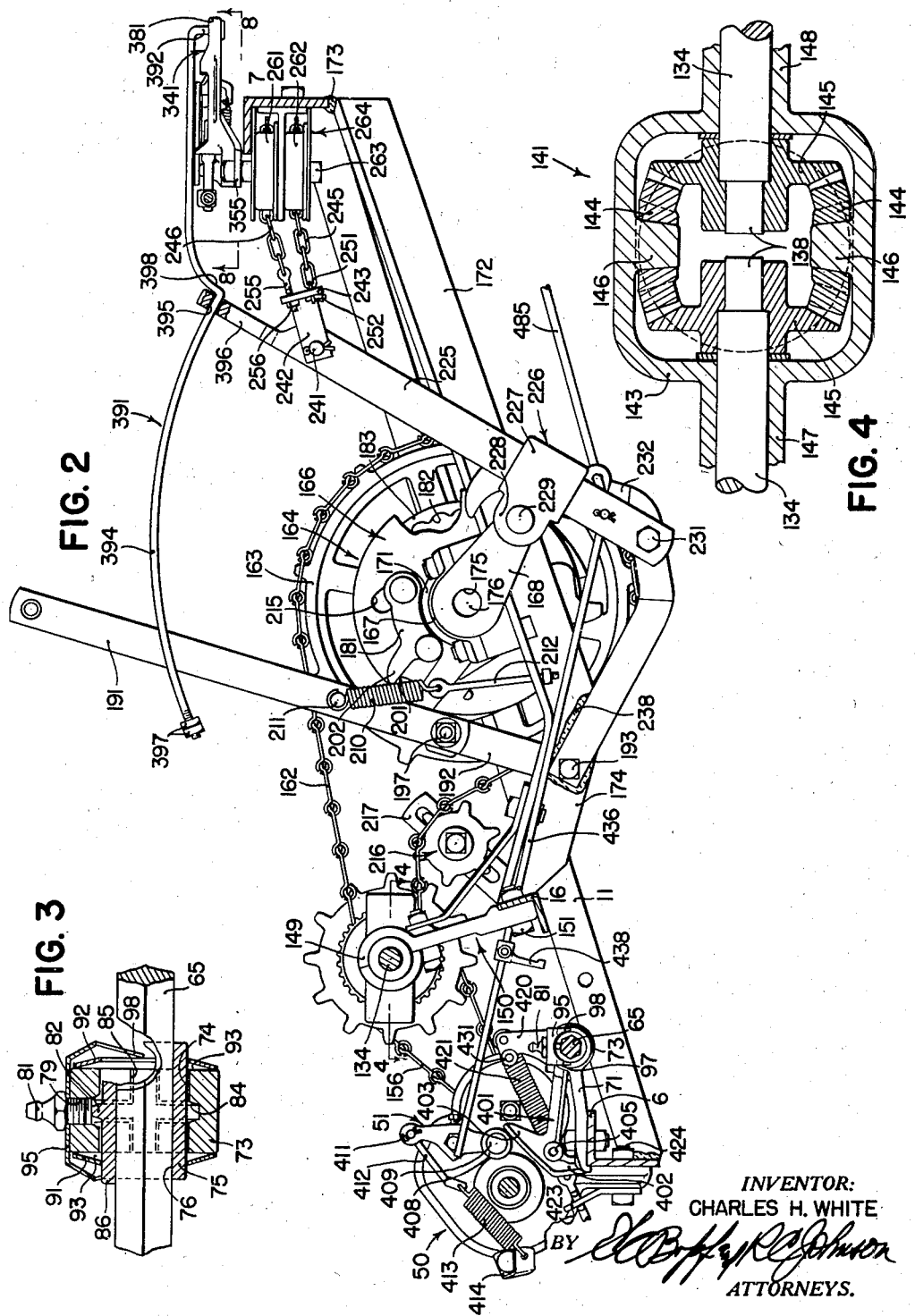

May 22, 1945.  C. H. WHITE  2,376,464
PLANTER
Filed March 31, 1941  7 Sheets-Sheet 3

INVENTOR:
CHARLES H. WHITE
BY
ATTORNEYS.

May 22, 1945.   C. H. WHITE   2,376,464
PLANTER
Filed March 31, 1941   7 Sheets-Sheet 4
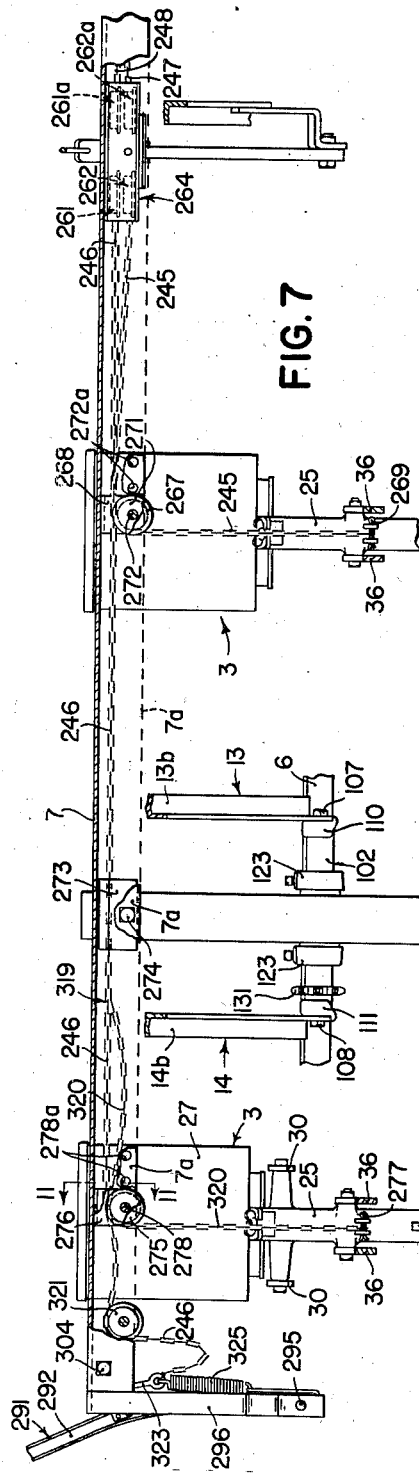
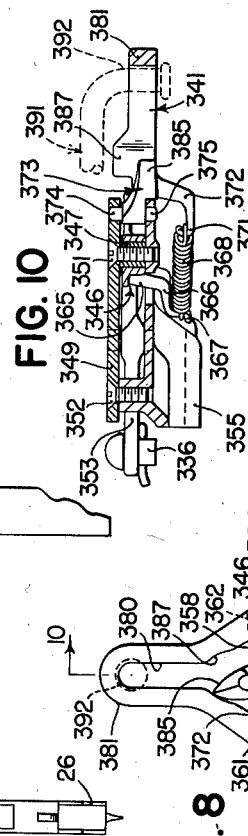
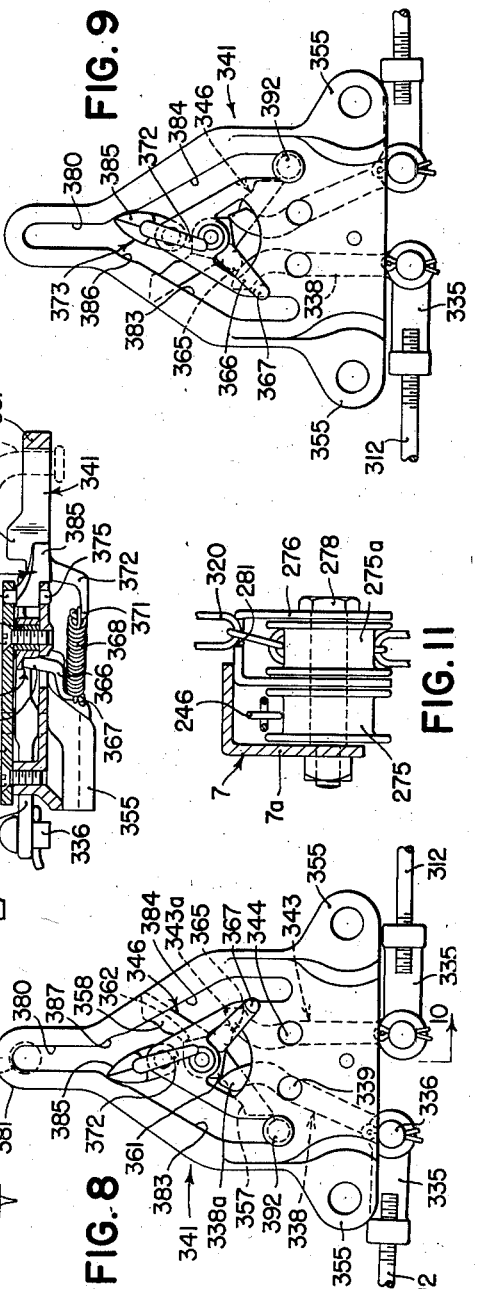
INVENTOR:
CHARLES H. WHITE
BY
ATTORNEYS.

May 22, 1945.　　　C. H. WHITE　　　2,376,464
PLANTER
Filed March 31, 1941　　　7 Sheets-Sheet 5
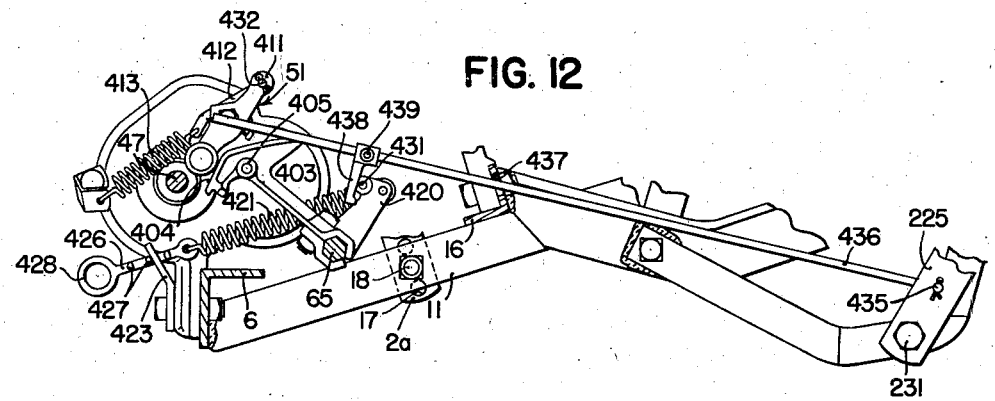
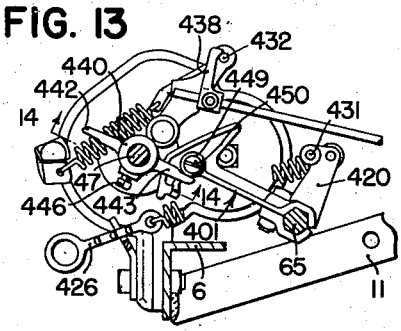
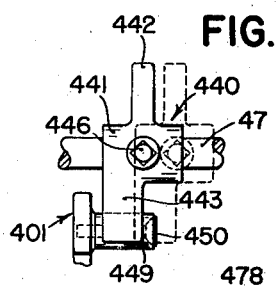
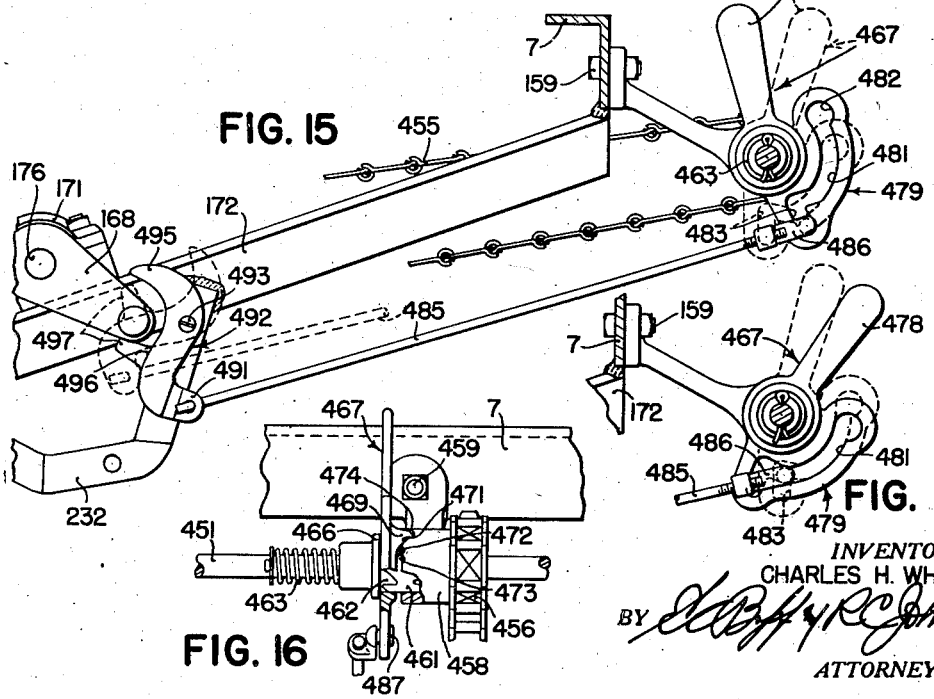
INVENTOR:
CHARLES H. WHITE
BY
ATTORNEYS.

May 22, 1945.  C. H. WHITE  2,376,464
PLANTER
Filed March 31, 1941  7 Sheets-Sheet 6
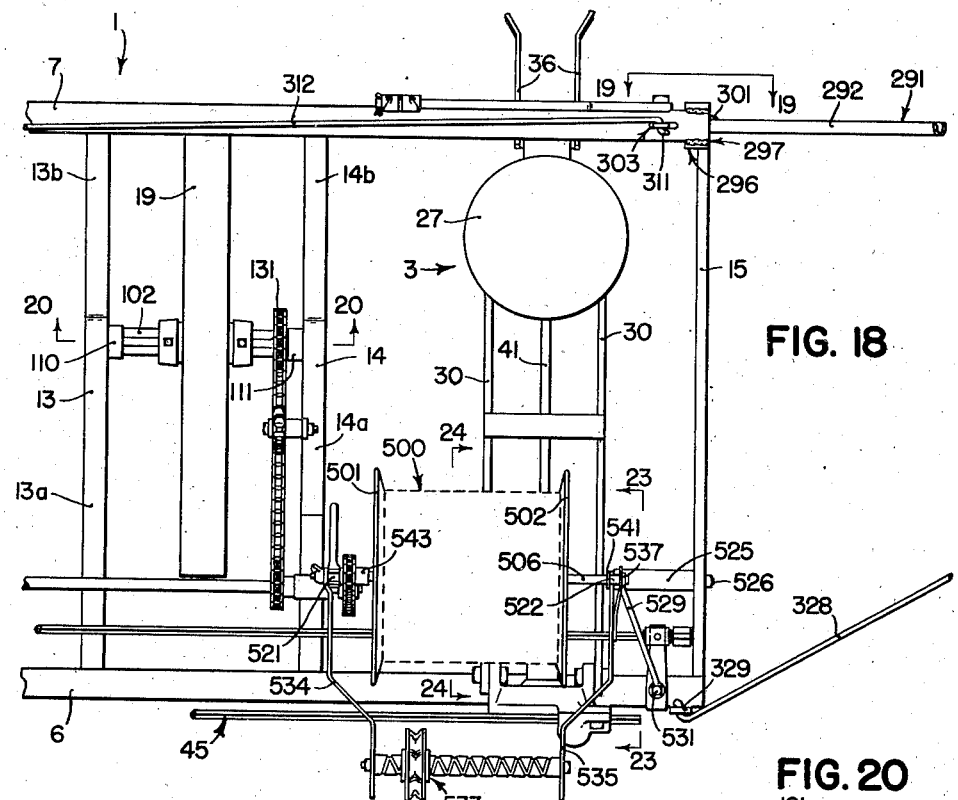
FIG. 18
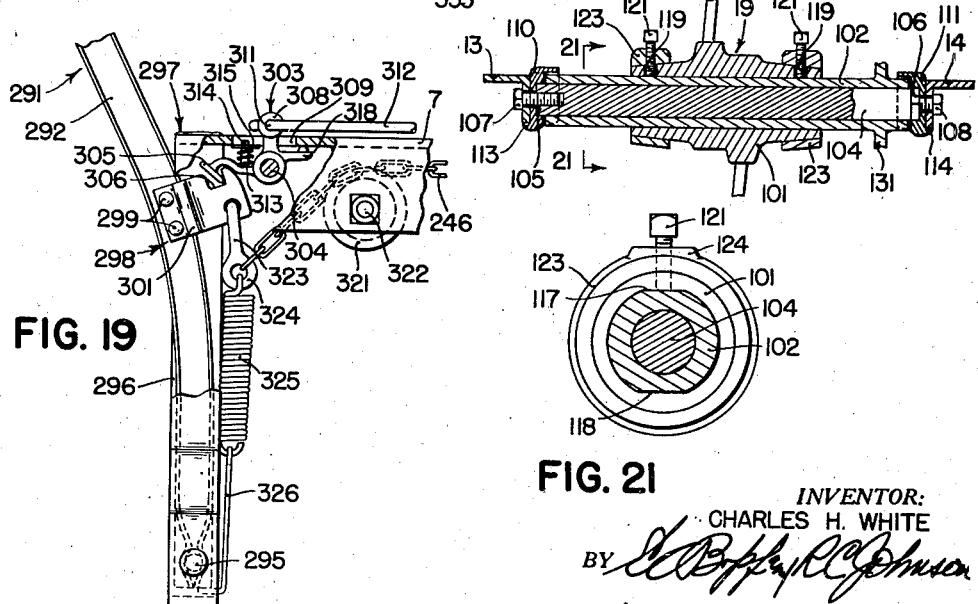
FIG. 19
FIG. 20
FIG. 21
INVENTOR:
CHARLES H. WHITE
BY
ATTORNEYS.

May 22, 1945.　　　　C. H. WHITE　　　　2,376,464
PLANTER
Filed March 31, 1941　　　　7 Sheets-Sheet 7
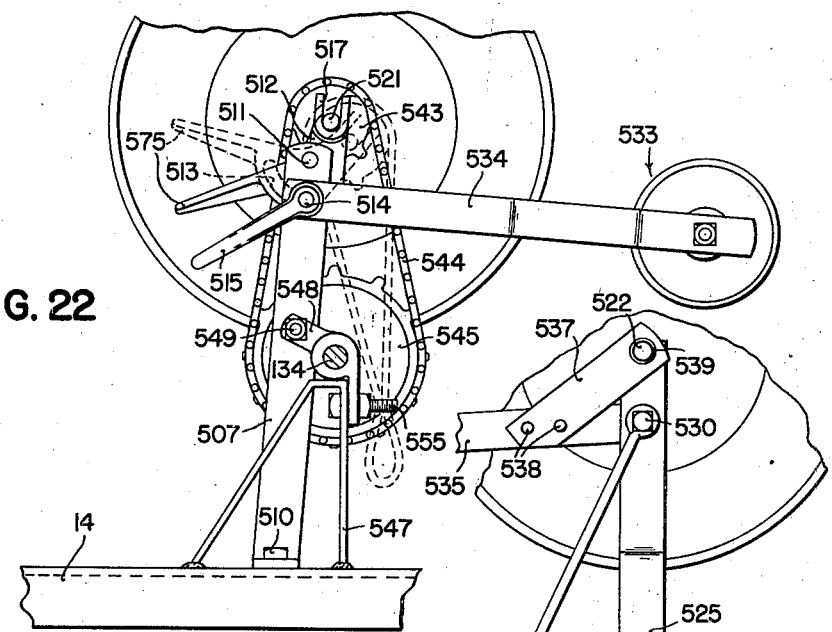
FIG. 22
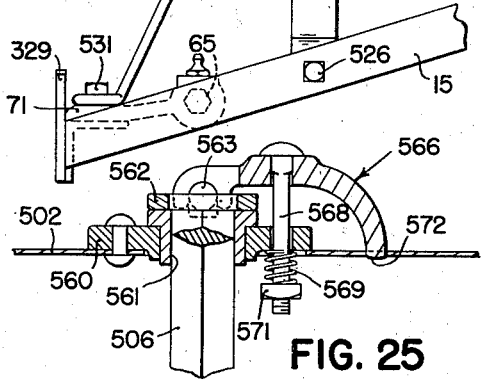
FIG. 23
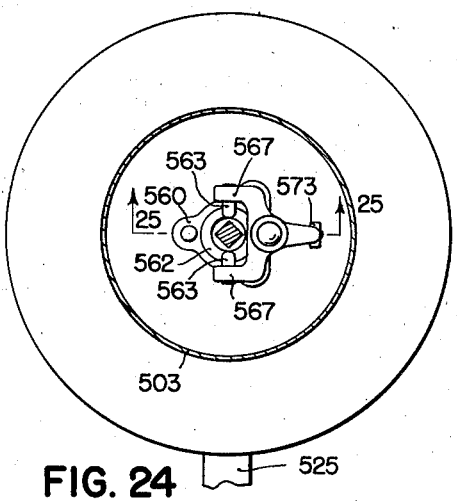
FIG. 24
FIG. 25
INVENTOR:
CHARLES H. WHITE
BY
ATTORNEYS.

Patented May 22, 1945

2,376,464

UNITED STATES PATENT OFFICE 2,376,464

PLANTER

Charles H. White, Moline, Ill., assignor to Deere & Company, Moline, Ill., a corporation of Illinois Application March 31, 1941, Serial No. 385,977

29 Claims. (Cl. 111—33)

The present invention relates generally to agricultural implements and more particularly to planters.

The object and general nature of the present invention is the provision of a planter which is particularly adapted for tractor operation and is capable of accurate check planting at speeds substantially greater than has heretofore been normally possible. By virtue of being able to plant at appreciably greater speeds than heretofore considered possible, the farmer is enabled to do his planting at just the right time when soil and weather conditions are the most favorable. This is especially important for those farming large acreages.

According to the principles of the present invention, I provide a number of correlated features that not only afford high accuracy at the greater speeds which tractor operation has made possible, but also simplify and speed up or facilitate other operations and adjustments that are entailed in putting in a crop. For example, it is an important feature of this invention to provide improved power lift mechanism by which the planting means may be raised and lowered by energy derived from the ground wheels of the planter, and more particularly it is a feature of this invention to incorporate a mechanical movement known as the Whitworth quick return motion that enables the lifting mechanism to operate through an appreciably greater range when lifting the tools than when lowering them. This motion thus has the advantage of small inertia shock loads, smoother action and less power requirement, all especially important in securing easy convenient control by the operator. Further, it is a feature of this invention to provide new and improved means whereby the markers are automatically controlled by the lifting mechanism, such automatic control including means whereby when the planting means is raised into inoperative position both markers are raised and when the planting means is lowered one or the other of the markers are also lowered into operative position alternately. Thus, when turning the outfit at the end of the row the operator need pay no concern whatsoever to tripping the correct marker arm, as was necessary heretofore, since according to the present invention the markers are controlled fully automatically. Specifically, according to the present invention, the markers are raised by suitable connections with the raising means for the adjacent planting means, together with marker arm controlling latches which are alternately released when the planting means is lowered into operative position.

Another feature of the present invention is the provision of self interrupting clutch means acting through the Whitworth quick return motion for raising the planting means, but which is not effective to lower the planting means until the implement actually moves forwardly. More particularly, it is a feature of this invention to provide means permitting the operator to actuate the clutch trip lever at any time but which, by virtue of a dead-center relationship established in the Whitworth quick return motion, does not permit the planting units to lower until the implement moves forwardly. Still further, it is a feature of this invention to provide means serving as a latch for automatically holding the trip lever in a position permitting the self-interrupting clutch to engage, which holding means is not released until the parts are driven at least through a partial revolution when the implement begins to move forwardly. This makes it possible for the operator at the end of the row to turn around and then while the implement is standing still, release the power lift clutch before starting up, but according to the present invention the planter shoes will not fall to the ground; instead, they are held up in raised position until the implement actually begins to move forwardly, whereupon they are permitted to lower. Thus, the operator is enabled when starting up to give his entire attention to starting the outfit and steering the same without having to wait until the outfit is in motion to pull the trip lever.

Another feature of this invention is the provision of improved differential means whereby power is derived from both ground wheels for driving the power lift mechanism.

The lifting mechanism derives its operating energy from the planter ground wheels, and according to the present invention improved supporting means for the ground wheels is provided whereby the latter are adjustable to accommodate the particular tractor to which the implement is hitched. For example, this adjustment permits running the ground wheels of the planter either in the center or completely out of the tractor wheel tracks, which is desirable in order to secure the best check. If the planter wheels run near the edge of the tractor wheel tracks, they have a tendency to climb out of the tracks and to cause the planter to get out of line.

In this connection it is a further feature of the present invention to provide laterally adjustable planting units so that the row spacing may be adjusted quickly and easily, and more specifically it is a feature of this invention to provide improved means whereby the operating connections for the valves, which are carried by the planting means, accommodate the lateral adjustment of the planting units. In this connection it is a further feature of this invention to provide an improved bearing accommodating a shaft that is uniformly polygonal in cross section, the latter feature materially facilitating the adjustment of the units to accommodate the desired row spacing.

Further, it is another feature of this invention to provide cushioned connections between the marker arms and the lifting means that raises the planting means. This enables the markers to be raised quickly, yet without imposing excessive inertia shock loads onto the lifting mechanism. Also, the type of movement, namely, the Whitworth quick return motion, utilized in lifting the planting means and the marker arms, contributes to the easy but relatively rapid raising of the markers. Additionally, means is provided for locking both the markers and the planting units in raised position without imposing the weight of these parts on the lifting mechanism. Ordinarily, the latter is permissible when simply turning at the end of the row, but when transporting the machine from field to field or along roads and highways, it is desirable to relieve the lifting mechanism of these loads, and this is accomplished simply and inexpensively by the present invention.

Another feature of the present invention is the provision of new and improved means for controlling the drill shaft from the raising and lowering means when drilling or planting in hills, rather than check-rowing. According to the principles of the present invention, means is provided whereby the implement may be adjusted conveniently and quickly to plant in hills or by drilling, in either case the hilling or drilling be automatically started and stopped according to the operation of the lifting mechanism. When check-rowing, a check wire is used, but when drilling or planting in hills the check wire is not used. Hence, according to the present invention, I provide new and improved means for supporting the check wire reel on the planter so that adjustments for laying out the check wire or reeling it in may be made easily and quickly, or the check wire reel may be easily and quickly removed from the planter, if desired.

Still further, an additional feature of this invention is the provision of improved means for controlling the drive to the fertilizer distributing mechanism, such control preferably including connections leading from the Whitworth quick return motion to a clutch or the equivalent incorporated in the drive from the ground wheels to the fertilizer distributing means. In addition, such controllable connections including means operable manually for effecting a disconnection so that the power lift mechanism may be actuated but without engaging or disengaging the fertilizer distributing mechanism drive.

These and other objects and advantages of the present invention will be apparent to those skilled in the art after a consideration of the following detailed description, taken in conjunction with the accompanying drawings illustrating the preferred structural embodiment of this invention.

In the drawings:

Figure 2 is an enlarged central section, taken generally along the line 2—2 of Figure 1, showing certain details of the Whitworth motion lifting mechanism, its connection to the planting means and the marker arms, and its connection with the drill shaft clutch and seed valve rocker shaft, whereby the lifting means controls the seeding mechanism when drilling or planting in hills;

Figure 3 is an enlarged section, taken along the line 3—3 of Figure 1, showing the bearing support for the rocker shaft;

Figure 4 is a view taken generally along the line 4—4 of Figure 2, showing certain details of the differential disposed between the two countershaft sections which form a part of the means for driving the lifting means from the ground wheels;

Figure 7 is an enlarged rear elevation, certain parts being shown in section, looking forwardly generally along the line 7—7 of Figure 1, showing the connection between the power lift means and the marker arms and planting means;

Figures 8 and 9 are enlarged detail views, taken generally along the line 8—8 of Figure 2, showing the means by which the lowering of the planting means by the power lift into operating position alternately drops one or the other of the markers;

Figure 10 is a section taken along the line 10—10 of Figure 8;

Figure 11 is an enlarged elevation of one of the lifting chain sheave brackets, showing the means whereby the chain may be engaged directly with the bracket to hold the associated planting unit or marker arm, or both, in raised position, independent of the position of the power lift mechanism;

Figure 12 is a view similar to Figure 2, showing the seeding mechanism arranged for drilling, with connections whereby the operation of the lifting mechanism automatically controls the drill shaft clutch and the valve rocker shaft;

Figure 13 is a fragmentary view, similar to Figure 12, showing the parts arranged for planting in hills;

Figure 14 is a view of the hill drop striker, taken generally along the line 14—14 of Figure 13;

Figure 15 is an enlarged section taken generally along the line 15—15 of Figure 1, showing the manner in which the crank of the Whitworth quick return motion controls the fertilizer distributing mechanism;

Figure 16 is a fragmentary rear view of the fertilizer distributing mechanism clutch and control therefor;

Figure 17 is a view similar to Figure 15, showing the fertilizer distributing mechanism control parts in inoperative position;

Figure 18 is a fragmentary enlarged plan view, showing in particular the check wire reel, with associated supporting and controlling means therefor;

Figure 19 is a view taken along the line 19—19 of Figure 18, with certain parts broken away, showing the marker arm support and latch means for holding the marker arm in raised position;

Figure 20 is a sectional view taken along the line 20—20 of Figure 18, showing the ground wheel support and means for fixing the same in laterally adjusted position;

Figure 21 is a sectional view taken along the line 21—21 of Figure 20;

Figure 22 is a side view of the check wire reel, showing the two positions of the drive chain, one in which the latter drives the reel for reeling up the check wire and the other in which the shaft of the reel is locked against rotation, for laying out the check wire;

Figure 23 is a side view, showing the other side of the check wire reel, being a section taken generally along the line 23—23 of Figure 18;

Figure 24 is a sectional view, taken generally along the line 24—24 of Figure 18, showing the adjustable means for frictionally connecting the check wire reel and the check wire reel shaft; and Figure 25 is a section taken generally along the line 25—25 of Figure 24.

Figure 1:
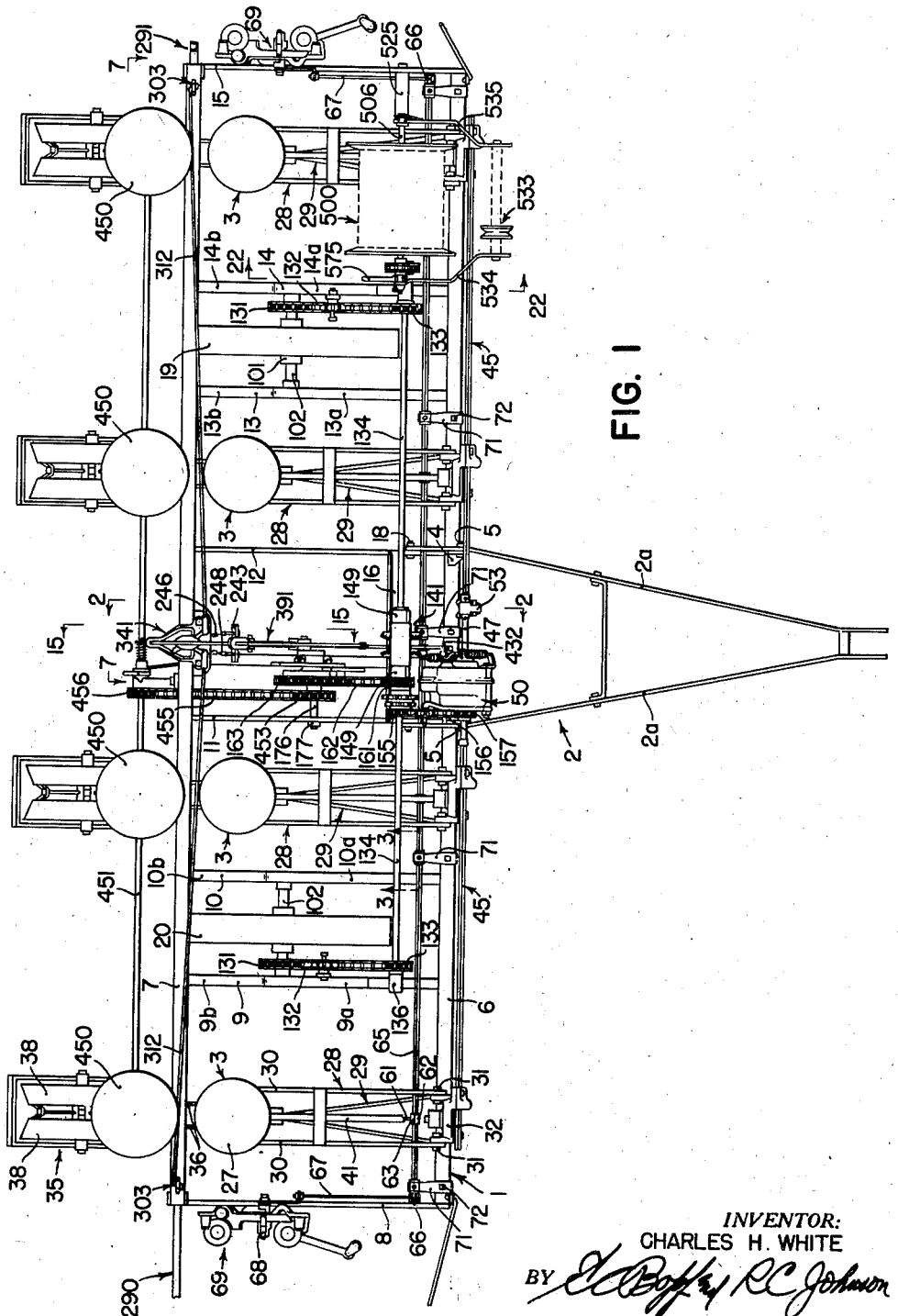
Figure 1 is a plan view of a four-row planter in which the principles of the present invention have been incorporated.

Referring now to the drawings, more particularly Figure 1, the planter chosen to illustrate the present invention is shown as a four-row planter and comprises a generally rectangular frame indicated in its entirety by the reference numeral 1, a draft frame indicated in its entirety by the reference numeral 2, and a plurality of planting units, preferably identical, each being indicated in its entirety by the reference numeral 3. The draft frame 2 is pivoted at 5 on brackets 4 on the main frame 1. The frame 1 comprises a front transverse angle bar 6, a rear angle bar 7 and several longitudinally disposed cross bars, indicated by reference numerals 8 to 15, inclusive. The cross bars 8, 11, 12 and 15 preferably are straight, and the two center cross bars 11 and 12 are connected by a transverse angle 16 disposed a short distance rearwardly of the front main transverse frame angle 6. The rear ends of the bars 2a of the draft frame 2 are bent downwardly (Figure 12) and each is provided with a plurality of apertures 17 to receive a bolt 18, whereby the hitch point may be adjusted to level the planter. The cross bars 9, 10 and 13, 14 are arranged in pairs, the bars of each pair being laterally spaced and bent adjacent their central portions so as to form front generally horizontal sections 9a, 10a, etc., and rear upwardly angled sections 9b, 10b, etc. Preferably, the cross frame members 9, 10 and 13, 14 are in the form of angles to serve as rigid supports connecting the ground wheels 19 and 20 to the frame 1. Reference to the particular manner in which the ground wheels are connected to the frame will be made below.

The planting units 3 are generally of conventional construction and each includes a hollow shank 25 (Figure 7) carrying a shoe 26 at its lower end and a seed can 27 at its upper end. The latter includes conventional seed selecting mechanism, including a rotatable seed plate (not shown), and the shank is connected for generally vertical swinging movement with the front frame bar 6 by means of a pair of generally parallel links 28 and 29, similar to the construction shown in my prior Patent No. 2,033,366, dated March 10, 1936, to which reference may be made if desired. Each of the upper links 28 consists of two bars 30 suitably connected together for purposes of rigidity and pivotally connected at their rear ends to the upper portion of the shank 25 and at their forward ends to suitable pivots 31 formed on or carried by a gear housing 32. The latter also carries lower pivots (not shown) to which the forward ends of the bars making up the lower link 29 are connected. The rear ends of the latter bars are pivoted in any suitable manner to the runner shank 25 below the upper bars 30. Each of the planting units 3 also includes a press wheel frame 35 including spaced bars 36 (Figures 1 and 7) which are preferably fixed to the associated shank 25 in adjusted position, and at their rear ends the bars 36 are spaced apart a distance sufficient to receive a pair of press wheels 38. By virtue of the parallel link arrangement 28, 29, each runner and associated press wheel construction is permitted to move generally vertically relative to the planter frame 1 and also relative to the other units. The seeding plate of each planting unit is driven by means of a longitudinally extending shaft 41 which is connected by universals, respectively, with a gear in the gear housing 32 and a gear at the bottom of the seed can 27 that drives the associated seed plate, the universals just mentioned being disposed in line with the pivots by which the upper link 28 is pivotally connected with the planter frame 1 and the planting unit 3, so that vertical movement of the runner shoe and associated parts will not affect the seed plate drive. A second gear in the gear case 32 meshes with the above-mentioned gear for driving the latter, and said second gear, together with the corresponding gears of the other planting units 3, is adapted to receive a polygonal (preferably square) drill shaft 45. The latter extends entirely through the associated part of the gear case 32, and each gear case is adapted to be fixed to the front frame bar 6 in different positions of lateral adjustment so as to provide for changing the row spacing. In one form of the present invention, the planting units are adjustable for 36-inch, 38-inch, 40-inch and 42-inch row spacing. In order to accommodate this spacing, I prefer to form the drill shaft 45 of uniform polygonal cross section and to extend the same entirely through the gear and associated gear casing so that when adjustments are to be made to change the row spacing, all that it is necessary to do is shift the associated gear casings along the front frame bar 6, the casings sliding along the drill shaft 45 of polygonal uniform cross section. Thus, so far as the drive from the drill shaft to the seed plates is concerned, it is not necessary to loosen any parts when making an adjustment for row spacing, except it is necessary to loosen an arm on the check fork rocker shaft which actuates the valve means (not shown) in the runner shank, as will be referred to below. The drill shaft 45 is formed as two outer sections, square in cross section, and an inner section 47 that extends through a gear case 50 which contains suitable speed change gears and a self-interrupting clutch mechanism of conventional construction, controlled by a clutch trip arm 51. The drill shaft is shiftable bodily laterally by means of a shifting member 53 for the purpose of selecting the desired gear ratio so as to advance the seed plates to select the desired number of kernels, usually 2, 3 or 4. This construction may be similar to that shown in my prior Patent No. 2,147,726, issued February 21, 1939, to which reference may be made if desired.

Each planting unit 3 includes valve mechanism, mentioned above, disposed in the runner shank and controlled by means of a valve rod 61 extending forwardly and connected by means of a valve actuating arm 62. The latter includes a cap and suitable bolt means whereby the arm may be firmly secured to a transversely extending rocker shaft 65 that extends from one side of the machine to the other, with its ends disposed just within the associated laterally outer frame cross bar 8 or 15, as best shown in Figure 1. An arm 66 is secured to each end of the rocker shaft 65 and is connected by a check fork rod 67 to the check fork 68 of a check head indicated in its entirety by the reference numeral 69. The check heads cooperate alternately with a check wire of conventional construction, and if desired the check heads 69 may be constructed as shown in my co-pending application, Serial No. 363,597, filed October 31, 1940. When the units 3 are laterally adjustable, as mentioned above, it is necessary to loosen the valve actuating arm 62, 63, tightening the same after the units 3 have been moved into their desired position relative to the drill shaft 45 and the rocker shaft, or check fork shaft, 65. The latter is of uniform hexagonal cross section to facilitate making such adjustments.

The rocker shaft 65 is supported on the front frame angle 6 for rocking movement by means of bearing arms 71 which are bolted, as at 72, to the front frame angle 6 in fixed position. Being of uniform hexagonal cross section, the rocker shaft 65 requires a particular bearing arrangement to accommodate this construction, and as best shown in Figures 2 and 3, the rear end of each rocker shaft arm 71 is provided with a cylindrical section 73 having an opening 74 to receive a chilled journal member 75. The latter is provided with a hexagonal central bore 76 to receive the hexagonal rocker shaft 65. Since the latter is of uniform cross section, the bearing member 75 and associated parts may take any position along the shaft and still provide a secure bearing support therefor. The enlarged end 73 of the arm 71 is provided with a tapped opening 79 to receive a lubricant fitting 81. The bore 79 communicates with the bore 74 in which the chilled journal 75 is mounted for rocking movement. The latter is provided with a lug 82 which, when the parts are assembled, is disposed in an annular groove 84, the function of which is to accommodate rocking movement of the shaft 65 and journal member 75 but to prevent the latter from becoming displaced relative to the supporting arm 71. In order to permit assembly, the arm 71 is formed with a transverse groove 85 open at either end and intersecting the annular groove 84. An index lug 86 is formed on one end of the member 75 so as to identify the location of the lug 82 in the annular groove 84. When assembling the parts, the journal sleeve 75 is first moved into place by sliding the lug 82 along the transverse groove 85 until it reaches the annular groove 84. Then the member 75 is given a partial revolution, after which the rocker shaft 65 may be inserted by merely sliding the same into the member 75. To retain lubricant within the bearing, I provide a pair of conical washers 91 and 92. These washers have relatively sharp edges which bear against the sides of the cylindrical portion 73 of the arm 71 and serve to provide a V-shaped ring of lubricant, indicated at 93, at each end of the bearing. A U-shaped spring 95 has ends 97 and 98 (Figure 2) formed to embrace the bearing member 75 and to bear against the conical washers 91 and 92 for holding them in position. It will be seen, particularly from Figure 3, that by virtue of the two annular reservoirs 93 of lubricant at each end of the bearing, an effective barrier against the entrance of dirt, grit and the like into the interior of the bearing is provided, yet the adaptability of the bearing member 75 to be disposed at any point along the hexagonal rocker shaft 65 is not disturbed and adequate lubrication for the rockable member 75, in whatever position the shaft may take relative thereto, is assured.

Since all of the bearing arms 71 for the rocker shaft 65 are of identical construction, the above description of one will suffice. It will be noted from Figure 1 that the engagement of the arms 66, which is a clamping engagement, with the shaft 65 just outside the outer bearing arms 71, serves to prevent axial displacement of the shaft 65. Moreover, if per chance one or the other, or both, of the arms 66 should become loosened, the engagement of the ends of the shaft 66 with the frame bars 8 and 15 will prevent the shaft 65 from shifting too far out of position to interfere with the proper operation of the associated valve mechanism and other parts.

The drill shaft 45 derives its operating energy from the ground wheels 19 and 20 through suitable operating connections constructed generally along the lines of the driving connections shown in my prior Patent No. 2,033,366, issued March 10, 1936, to which reference may be made if necessary. According to the present invention, and as best shown in Figures 1, 18, 20 and 21, the left hand ground wheel 19 includes a hub 101 that is mounted non-rotatably on a sleeve 102. The latter is supported for rotation on a shaft 104, the ends 105 and 106 of which are tapped to receive fastening cap screws 107 and 108. A pair of sand caps 110 and 111 are formed with hexagonal sockets, and the end 106 of the shaft 104 is upset to fit non-rotatably in the sand cap 111. The socket in the other sand cap 110 receives the round end 105 of the shaft 104. The two sand caps 110 and 111, which preferably are identical, are provided with lugs 113 and 114 which engage underneath the associated frame angles 13 and 14, respectively. The vertical flanges of the angles are apertured to receive the fastening cap screws 107 and 108. By virtue of the fact that the sand collars 110 and 111 engage the angles 13 and 14 non-rotatably and the fact that the cap 111 also engages the shaft 104 non-rotatably, the latter is fixed firmly and securely to the planter frame 1. The sleeve 102, which is mounted for rotation on the fixed shaft 104, is considerably longer than the hub 101 of the wheel 19, thereby providing an opportunity to adjust the lateral position of the wheel relative to the planter frame, not only to accommodate different adjusted positions to which the planting units 3 may be moved, but also to provide an opportunity for the farmer to adjust the wheels so as to follow in the center of the tracks of his tractor or entirely away from them. To this end, I form the rotatable sleeve 102 with an exterior surface so as to present the cross section shown in Figure 21, the sleeve 102 having exterior flat sections 117 and 118. The interior of the wheel hub 101 is of complementary formation, and further, the hub 101 is provided with cored openings 119 to receive the inner end of a set screw 121. A collar 123 is disposed at each end of the wheel hub 101 and is provided with a thickened section 124 that is tapped to receive the associated set screw 121. By tightening the set screws 121, the wheel 19 can be secured in adjusted position securely to the rotatable sleeve 102, and by loosening the screws 121, the wheel may be slid to any desired position thereon. If desired, the ends of the hub 101 may be threaded to receive the cap screws 121, thereby eliminating the collars 123. However, I prefer the construction shown since breakage of the hub at one of the openings therein would require replacing the entire wheel, whereas breakage of one of the collars 123 would be a relatively minor matter and could be easily and cheaply replaced. The right hand wheel 20 is connected with the planter frame in the same manner and by identical means with that described above, and hence further description is unnecessary.

Each of the rotatable sleeves 102 is provided with a sprocket 131 over which a driving chain 132 is trained. The chains 132 are trained at their forward portions over sprockets 133, one of which is fixed to the outer end of each of two countershafts 134. The outer end of each countershaft is supported by suitable bearing means 136, and at its inner end each countershaft 134 is provided with a squared portion 138. Suitable differential means, indicated entirely by the reference numeral 141, is connected with the adjacent inner ends 138 of the countershaft sections 134, and the differential 141 is particularly constructed for quick and inexpensive assembly. To this end, the differential 141 includes a casting 143 which serves as a gear carrier for a pair of planet pinions 144. The latter mesh with bevel gears 145 that are disposed, respectively, on the inner squared ends 138 of the countershaft sections 134. The differential gear carrier casting 143 is also provided with sleeve sections 147 and 148 that are supported by suitable bearings 149 on the transverse angle 16 (Figures 1 and 2).

The method of assembling the differential 141 is as follows: The two planet pinions 144 are mounted on their respective pivot studs 146. Next, the two bevel gears 145 are placed in mesh with the pinions 144 with one gear 145 above the central opening in the gear carrier 143 and with the other gear 145 below the opening. Then the two gears 145 are rocked or rolled about the axis defined by the studs 146 into position with the hubs of the gears 145 in line with the sleeves 147, 148. Lastly, the two countershaft sections 134 are inserted or passed through the respective sleeves 147 and 148 and into the hubs of the bevel gears 145. The hubs of the gears are provided with square openings to receive the ends 138 of the countershafts 134, which ends 138 are square. By this means driving connection is established without any other parts. When once the parts are in position as just described, they are completely assembled without the use of any other fastening means. The position of the two bevel gears 145 before they are rocked or rolled into place in the gear carrier 143, is indicated in dotted lines in Figure 4.

Preferably, the bearings 149 form a part of a bearing support 150 bolted, as at 151, to the frame angle 16, as best shown in Figure 2. The sleeve 147 is extended toward the right side of the frame and formed with or carries a sprocket 155 connected by a drive chain 156 to a sprocket 157 that forms a part of the gearing disposed within or carried by the gear case 50 (Figure 1). By this means, the drive from both wheels 19 and 20 is transmitted through the differential means 141 to the gearing 50 that drives the drill shaft 45. When check-rowing, the rocker shaft 65 is operated from the check forks 68, but as will be described below, when drilling or planting in hills the rocker shaft 65 is adapted to be actuated by other means.

Figure 5:
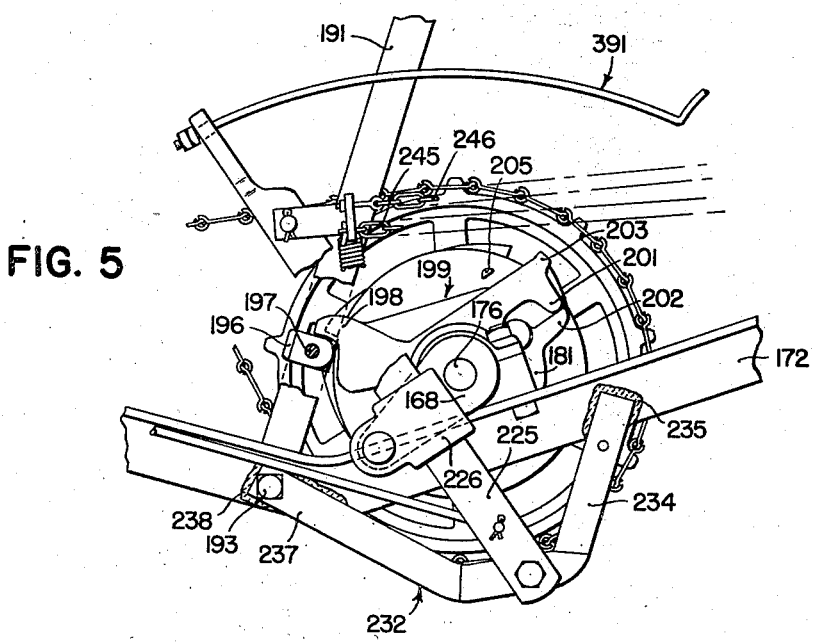
Figure 5 is a view similar to Figure 2, showing certain parts of the lifting means in its raised position.
Figure 6:
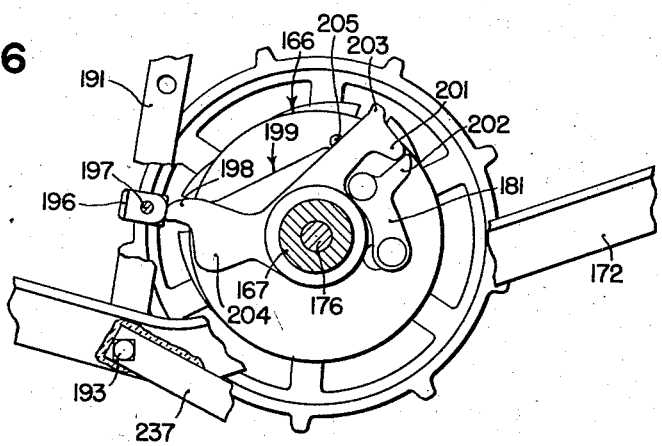
Figure 6 is a view similar to Figure 5, showing means whereby the power lift clutch trip lever is automatically held against returning to its engaged position until after the implement moves forwardly and begins to lower the tools.

A second sprocket 161 is formed on or carried by the sleeve section 147 of the gear carrier 143 and is connected by a chain 162 (Figure 2) with the drive sprocket 163 of a self-interrupting clutch indicated in its entirety by the reference numeral 164. The latter includes a driven member 166 which has a portion extended to form a hub 167 that terminates laterally in a crank member 168. The hub section 167 is supported for rotation by bearing means 171 carried by an angle member 172 that is welded, as at 173, at its rear end to the rear frame angle 7 and extends downwardly and forwardly therefrom and then upwardly, as at 174, and is secured to the cross angle 16. The angle 172 forms the principal support for the lifting mechanism, of which the clutch 164 mentioned above is a part, and cooperates with the adjacent frame bar 11 in supporting the entire clutch structure and associated parts. The driven member 166 of the clutch, of which the crank 168 is an integral part, is formed with a central opening 175 that extends through the entire unit, the member 166 having a hub (not shown) upon which the driving sprocket 163 is mounted. A fixed shaft 176 has one end supported within the crank end of the member 166, as best shown in Figure 2, while the other end of the member 176 is provided with left hand threads and is secured to the bar 11 by a nut 177. Thus, the entire clutch and driving unit is mounted for rotation on the fixed shaft 176 which is supported by the two frame bars 11 and 172. The clutch 164 is, so far as the clutch details is concerned, of conventional construction and embodies a clutch dog 181 carrying a roller (not shown) at its inner end that is adapted to engage one of the scallops 182 formed on the flange portion 183 of the sprocket 163. When the clutch dog roller engages the flange 183, the driving and driven parts of the clutch are connected together in driving relation. Suitable spring means within the clutch serves to bias the clutch dog 181 for movement into a position causing the roller to engage the scallops 182, and to disengage the clutch dog 181, I provide a trip lever 191 which includes a lower section 192 mounted for pivotal movement on a bolt 193 carried by the frame angle 172. A lug 196 is bolted, as at 197, to the lever 191 (Figures 2, 5 and 6) and is adapted to engage one end 198 of a lever 199 that is mounted for rotation about the axis of the clutch parts. Opposite the end 198, the lever 199 is provided with a nose 201 which engages a lug 202 formed on the clutch dog 181. By virtue of the contact between the part 201 with the clutch dog part 202, the clutch dog is controlled by the lever 199. The latter also has an end 203 which, like the end 198, extends radially beyond the periphery of the driven clutch member 166 and is left in a position to be engaged by the lug 196 on the trip lever 191. Figure 5 shows the clutch disengaged, the end 198 of the clutch controlling lever 199 being in engagement with the lug 196 on the trip lever, whereby the end 201 of the lever 199 engages the clutch dog 181 at 202 and shifts the roller radially inwardly out of engagement with the scallops 182 (Figure 2) on the driving member 163. When the parts are in the positions shown in Figure 5, the clutch is disengaged. A spring 210 is connected at its upper end with a pin 211 carried by the trip lever 191 and at its lower end is connected to an eye bolt 212 that is anchored in the horizontal flange of the angle 172, just forwardly of the bearing 171. The spring 210 thus urges the trip lever 191 toward a position in which the lug 196 will engage either the end 198 or the end 203 of the clutch dog controlling lever 199.

It will be remembered that the sprocket 163, which constitutes at least a part of the driving member of the self-interrupting clutch 164, is constantly driven by the chain 162 and other parts from both ground wheels 19 and 20 of the planter. Therefore, when the trip lever 191 is moved forwardly, or to the left as viewed in Figure 5, the lug 196 will be carried away from the end 198 of the clutch controlling lever 199, whereupon the spring on the inside of the clutch will act to move the clutch dog roller into engagement with the scallops on the driving flange 183. If the implement is in motion then the drive will be transmitted from the ground wheels through the clutch 164 to the crank 168. The latter will therefore be driven, in a counterclockwise direction as viewed in Figure 5, until the end 203 has rotated an amount sufficient to come into engagement with the lug 196, assuming the operator has by this time released the trip lever 191 so that the spring 210 pulls the trip lever back into its original position in which the lug rides along the periphery of the member 166. When the end 203 engages the lug, the clutch dog controlling lever 199 can no longer rotate with the driven member 166 of the clutch so that a slight additional rotation of the parts will cause the end 201 of the lever 199 to act against the end 202 of the clutch dog 181, swinging the roller out of engagement with the scallops 182 on the driving flange 183 (Figure 2) thus interrupting the drive and terminating the movement of the crank 168 in about the position shown in Figure 2. The clutch dog 181 is connected with the roller (not shown) on the inside of the member 166 by a connection extending through a slot 215 formed in the member 166. The driving chain, by which drive from the ground wheels is transmitted to the driving sprocket 163, is maintained tight by means of an idler sprocket 216 adjustably supported on a bracket 217.

The crank 168 is operatively connected to raise the planting shoes or runners into raised or transport position by means that includes a swingably mounted lever 225. The crank 168 and the lever 225 are connected together by a slide 226 which has a portion 227 slidably receiving the lever 225 and a bearing section 228 in which a crank pin 229 on the crank 168 is received. The swingably mounted lever 225 is pivoted on a bolt 231 carried by a bracket 232, one end 234 of which is disposed laterally and welded, as at 235, to the supporting frame bar 172. The other end 237 of the support 232 is welded at 238 to the angle 172. The crank 168 and swingably mounted lever 225, together with associated parts, constitute a Whitworth quick return motion and has the operating characteristic that the extent of rotation of the crank to swing the lever from one position to the other is much greater than is required to swing the lever from said other position back to said one position where the crank always rotates in one direction. This type of movement is made use of in the present invention for the purpose of securing a lifting action through an effective range of movement which is much greater when lifting than when lowering. For example, Figure 2 illustrates the position of the swingably mounted lever 225 that corresponds to the lowered position of the planting shoes. The crank 168, when the trip lever 191 is moved forwardly and the clutch engaged, moves in a counterclockwise direction through an angular displacement of approximately 240 degrees and swinging the lever 225 forwardly to the position shown in Figure 5. On the other hand the rotation of the crank 168, again in a counterclockwise direction, from the position shown in Figure 5 back to the position shown in Figure 2, requires an angular displacement of only approximately 120 degrees. Thus, the amount of power required is reduced by the same proportion that the raising range is extended, as compared with the lowering range. The relative magnitude of these ranges may be selected as desired by choosing the proper length of crank 168 and the proper distance between the pivots 176 and 231. When the swingably mounted lifting lever 225 is in its raised position, as shown in Figure 5, the parts occupy substantially a dead-center position, whereby the weight of the tools imposed by the lifting lever 225 against the crank 168 has no tendency to rock the latter in either one direction or the other. The means by which the swingably mounted lifting lever 225 is connected to the tools and other parts will be described later.

The fact that the type of motion incorporated in the lifting mechanism of the present invention makes it possible to employ a relatively stable dead-center relation, due partly because of the arrangement of the slide 226 on the swingable lever 225, affords an opportunity to provide means associated with the self-interrupting clutch trip lever 191 whereby it may be momentarily actuated to engage the clutch when the implement is not in motion, conditioning the clutch so that it will transmit lowering motion to the tools as soon as the implement starts to move forwardly, but which does not permit the implement tools to fall to the ground the instant the trip lever 191 has been actuated. With this type of construction it then becomes desirable to provide some means for holding the trip lever in its disengaged position after having once been momentarily moved into its disengaged position to provide for engaging the lifting clutch. To this end and according to the present invention I so construct the clutch dog controlling lever 199 so that, whether the lifting mechanism is in its raised position or in its lowered position, the clutch lever 199 is always biased to move in a counterclockwise direction and so bring one or the other of its ends 198 and 203 behind the lug 196 on the trip lever 191 the instant the latter is moved, in a counterclockwise direction as viewed in Figure 5, to permit the lifting clutch to engage. A weighted section 204 on the part 199 aids in this action; and a lug 205 on the clutch member 166 limits the movement of the part 199. Thus, it is possible for the farmer to pull the trip rope when the implement is standing still whereby the lifting clutch is placed in engaging position but in which the tools are held in raised position until the implement is actually moving forwardly so that the drive from the ground wheels can act through the engaged lifting clutch to swing the lifting crank 158 from the position shown in Figure 5 back toward the position shown in Figure 2. This has an especially important advantage in a planter, for if the runners of the latter should be dropped to the ground while the planter is stationary, it would cause only a very slight backward movement of the runners, which might easily occur inadvertently, to clog the runners with earth. This would interfere with the proper planting of the seed and would probably require that the farmer dismount from the tractor, go back and manually clear out the runners before proceeding further. It is therefore an important feature of this invention to provide means insuring that the planter shoes will not be dropped, even though the clutch trip lever is actuated, until the implement actually is moving forwardly.

The means for connecting the swingably mounted lever 225 with the tools will now be described.

The Whitworth quick return motion follower lever 225 is apertured at its upper end to receive a pin 241 by which a stirrup 242 having a laterally directed piece 243 is connected. The ends of the plate 243 are apertured to receive means by which four chains 245, 246, 247 and 248 are connected thereto. As best shown in Figures 1 and 7, the chains 245 and 246 are disposed at the left side of the planter and the chains 247 and 248 are disposed at the right side, constituting two pairs extending rearwardly and then laterally outwardly from the follower lever 225. The means connecting each pair of chains to the plate 243 preferably comprises a link 251 (Figure 2) that extends through an opening in the lower portion of the left side of the plate 243, with a cotter 252 or equivalent means passed through the link 251 at the forward side of the plate 243. The link 251 connects the lower chain 245 to the plate 243. The upper chain 246 of this pair is preferably connected to the plate 243 by means of an eye bolt 255 threaded at its forward end and carrying an adjusting nut 256. The upper chain 246 is connected by any suitable means to the eye of the bolt 255. The other pair of chains 247 and 248 are connected to the right end of the plate 243 by the same means, and hence further description is unnecessary. Referring particularly to the left hand pair of chains 245 and 246, it will be seen from Figure 2 that they are trained around a pair of sheaves 261 and 262 which are disposed for rotation on a shaft 263 that forms a part of a bracket structure 264. Similarly, the right hand chains 247 and 248 are trained over a pair of sheaves 261a and 262a (Figure 7). The chains 245 and 246 are extended from the bracket 264 laterally outwardly along the rear frame bar 7, as best shown in Figure 7, just inside the rear flange 7a thereof. The first chain 245 is extended over a sheave 267 carried by a sheave bracket 268 connected by a bolt 272 to the rear frame angle 7 immediately behind the inner left hand planting unit 3. The chain 245 then extends downwardly and is connected to the shank 25 of the left inner unit 3 by means of a cotter 269. The other chain 246, which is heavier than the chain 245, extends over a second sheave 271 carried on the pivot bolt 272 between the bracket 268 and the vertical flange 7a of the angle 7. The bracket 268 is prevented from turning on the bolt 272 by virtue of the engagement of its upper end with the horizontal flange of the angle 7, the construction being substantially the same as the bracket 276 and associated parts shown in Figure 11 and described below. Laterally outwardly of the bracket 268 the upper chain 246 extends through a chain guide 273 bolted as at 274 to the flange 7a of the angle 7 and passes over another sheave 275 carried by a bolt 278 passing through the rear frame angle 7. The pivot bolt 278 also carries a sheave bracket 276. Preferably, the bracket 276 is substantially identical with the bracket 268. Passing over the sheave 275, the chain 246 extends laterally outwardly over a sheave 321 carried on a bolt 322 and is connected with the marker arm 291, as will be described below. The bracket 276 is mounted on the frame angle 7 substantially directly behind the outer left hand planting unit. An auxiliary lifting chain 320 is connected to the lifting chain 246, as at 319, and extends over a sheave 275a on the bolt 278, and thence downwardly where it is connected with the shank 25 of the outside left hand planting unit 3. The other pair of chains 247 and 248 are supported and connected, respectively, to the right hand inner and outer planting units 3 in substantially the same manner just described, and hence a further description is unnecessary. By virtue of the two sets of chains 245, 246 and 247, 248 whenever the follower arm 225 is swung by the rotation of the crank 168 from the position shown in Figure 2 to the position shown in Figure 5, a pull is exerted on the chains which lifts all four planting units into their raised position, the units being locked in their raised position by virtue of the dead-center relation between the lever 225 in its forward position and the crank 168 (Figure 5). If it should be desired to relieve the lifting mechanism of the work of holding the planting units 3 in their raised position, the chains may be hooked directly to the frame angle 7. To this end, I provide each of the brackets 268 and 276 with a slot 281 in which one of the links of the associated chain may be engaged, thus mechanically and positively holding the associated runners in their elevated position. This takes the strain off of the major portions of the chains and the lifting mechanism and is preferably used when transporting the machine from field to field or along highways. Figure 11 shows the bracket 276, and it will be understood that the other bracket 268 is of similar slotted construction.

As mentioned above, the planting units 3 may be adjusted on the frame 1 to provide for different row spacings. The rear angle 7 is therefore provided with a plurality of openings 272a and 278a so that the bolts 272 and 278 may support the brackets 268 and 276 in positions corresponding to the positions of the planting units 3. The cotters 269 and 277 may be readily removed and engaged with different links of the lifting chains 245 and 246 so as to adjust the lifting means for the various positions of the brackets 268 and 276.

According to the present invention, automatic markers are provided in which a pull on the power lift trip rope engages the clutch so that when the planter moves forwardly and the planting units are lowered, the proper marker is dropped automatically. When the power lift is actuated to raise the units, as at the end of the row, the marker is raised as the runners are raised. Lastly the subsequent operation of the power lift trip rope engages the clutch and, when the implement moves forwardly, again lowers the runners and also the other marker. The automatic marker mechanism will now be described.

The right and left hand markers are indicated, respectively, by the reference numerals 290 and 291 (Figure 1), and since the marker arms and associated parts are substantially identical, a description of one will suffice. Referring now more particularly to Figures 7 and 19, which show the left hand marker, it will be seen that each marker includes a marker arm 292 of generally channel construction with the flanges extending rearwardly, thus presenting what is equivalent to a rounded front side upon which it is unlikely that the check wire or other objects will catch. A marking disc (not shown) is fixed to the outer end of the marker arm 292 in any suitable manner. The lower or inner end of the marker arm 292 is supported for pivotal movement on a pin 295 which is fixed to the lower end of a standard 296 the upper end of which is fixed in any suitable manner to the outer end of the rear frame angle 7. Preferably, the standard 296 consists of a U-shaped strap, the ends of which are welded to the angle 7, as at 297 (Figure 19). To provide a longer bearing at the lower portion of the marker arm 292, through which the pivot pin 295 extends, the flanges of the marker arm 292 are crimped as shown in Figure 19. A latch bracket 298 is riveted, as at 299, to the marker arm at a point thereon adjacent the end of the frame angle 7 when the marker arm is raised, the bracket 298 thus being a considerable distance from the pivot 295. The bracket 298 is bent, as at 301, to accommodate the marker arm flange over which the bracket extends. A marker arm latch 303 is pivotally mounted on a bolt 304 carried by the vertical flange of the angle 7 at the outer end thereof. The latch 303 is provided with a detent 305 that is adapted to engage in a notch 306 formed in the marker bracket 298. The marker latch 303 also includes an end 308 that extends upwardly through a slot 309 formed in the horizontal flange of the angle 7, the end 308 being apertured to receive the laterally outer bent end 311 of a latch controlling rod 312. A spring 313 is disposed about a lug 314 formed on the detent section 305 of the latch 303, the spring 313 bearing against a washer 315 which overlies the slot 309. The spring 313 thus serves as means biasing the latch 303 for engagement in the marker bracket notch 306. The latch 303 has an extension 318 which is formed to engage the under side of the horizontal flange of the frame angle 7 opposite the detent section 305, thus serving as means limiting the movement of the detent section under the bias of the spring 313.

The marker latch bracket 298 also serves as a part of the means by which a marker lifting chain 246 (Figures 7 and 19) is connected at its outer end to the marker 291 in cushioned relation. As best shown in Figure 19, the outer end of the chain 246 is trained over the sheave 321 and is connected to a link 323, one end of which is pivoted in an opening in the marker latch bracket 298. The other end of the link 323 is provided with an eye 324 in which one link of the chain 246 is disposed and also the upper end of a spring 325. The lower end of the latter is anchored to the lower end of the standard 396 by a rod or link 326. The inner end of the outer planting unit lifting chain 320, as best shown in Figure 7, is connected to the chain 246. Thus, whenever the power lift is actuated and pulls the chain 246 in a direction to raise the associated marker, a pull is also exerted through the lifting chain 320 against the runner shank of the associated planting unit. The pull on the marker is cushioned by the spring and link 323, 325, whereby the strain of lifting the marker arm and the inertia loads incident to initially raising the marker are cushioned. The initial tension imparted to the spring 325 when lifting the markers also serves to insure that the marker arm will be brought up to a position in which it will be engaged by the latch 303. When the latter hooks into the bracket 298, the marker arm 292 will be locked in raised position, entirely independent of the chain 246. Thus, it is not necessary to provide any slotted bracket for the chain 246 for transport purposes. When it is desired to lower the marker 291, a pull may be exerted on the latch controlling rod 312 so as to swing the latch 303 in a clockwise direction (Figure 19), thereby releasing the marker and permitting the same to swing downwardly, providing of course, that the chain 246 is slack, which occurs when the lifting arm 225 is in its rear position (Figure 2).

The right hand marker is of similar construction, the parts being substantially identical except that some may be right hand while the others are left hand, and hence a further description of the marker arm and latch means adapted to hold the same in raised position is unnecessary. Each marker arm is reenforced by a tension rod 328 that is connected at its outer end to the outer end of the associated marker arm and is pivotally connected at its inner end to a bracket 329 fixed to the end of the front frame angle 6, as best shown in Figure 18.

One feature of the present invention is the control of the marker raising and lowering means and the associated marker arm latch means by suitable connections with the power lift mechanism that raises and lowers the planting means. As best shown in Figure 1, the right and left hand marker latch controlling rods 312 extend laterally inwardly from the latches 303 to substantially the center of the machine. The inner end of each of these latch controlling rods 312 is threaded into a marker latch rod casting 335, each of which receives a pivot pin 336. A left hand latch rod pull lever 338 is provided with an opening at one end to receive the pin 336 and is also provided with a pair of lugs 339 by which the pull lever 338 is mounted for limited swinging movement in a marker control bracket 341, best shown in Figures 2, 8, 9 and 10. A right hand latch rod pull lever 343 is provided with an opening at one end to receive the pin 336 of the left hand latch rod 312 and is also provided with a pair of lugs 344 by which the lever 343 is mounted in the bracket 341 alongside the left hand latch rod pull lever 338. The end of each of the levers 338 and 343 opposite the end receiving the associated pin 336 is curved, as at 338a and 343a. These curved ends cooperate with a marker trip cam member 346. The member 346 is mounted for rocking movement on a bushing 347 that is clamped between an upper bracket plate 349 and the central portion of the bracket 341 by means of a screw 351. The upper plate 349 is secured by a similar screw 352 to a lug 353 carried by or formed on the bracket 341, the lug 353 and the bushing 347 serves as spacing means disposing the plate 349 a distance above the body of the bracket 341. The latter is provided with a pair of ears 355 by which it is secured to the upper ends of the bolts 263 on which the chain sheaves 261, 262 and 261a, 262a are mounted. By this means the bracket 341 is fixed to the central portion of the rear frame angle 7. If desired, however, the bracket 341 may be bolted directly to the angle 7.

Referring again to Figures 8 and 9, the cam member 346 is provided with a pair of arms 357 and 358, extending generally in diametrically opposed relation, and a pair of shoulders 361 and 362, the shoulders being adapted to engage the curved ends 338a and 343a, respectively. A third shoulder 365 (Figure 10) is formed on the cam member 346 generally midway between the shoulders 361 and 362, and the shoulder 365 is adapted to engage either one or the other of the curved pull lever ends 338a and 343a. An arm 366 extends downwardly and generally radially outwardly and has a hook end 367 formed thereon and adapted to receive one end of a spring 368 (Figure 10), the opposite end of which is adapted to engage over the hook end 371 of a similarly extending arm 372 formed on the lower portion of a marker control reversing swivel 373. The latter member is provided with upper and lower studs 374 and 375 adapted to be received in suitably formed openings in the upper plate 349 and the adjacent portion of the central part of the bracket 341, as best shown in Figure 10. From Figures 8 and 9 it will be seen that the swivel arm 372 extends over the axis defined by the pivot studs 374 and 375.

The bracket 341 is generally triangular in shape and is formed with a slot 380 extending from the tip 381 of the bracket 341 forwardly to a point adacent the pivot axis of the reversing swivel 373, at which point the slot 380 forms two branches 383 and 384. As best shown in Figures 8 and 9, the two arms 357 and 358 of the cam member 346, pass over the slots 383 and 384. The reversing swivel 373 has a nose 385 which is formed to swing from one side to the other of the forward portion of the slot 380, and to this end the bracket 341 is provided with a pair of recesses 386 and 387. A marker control actuating rod 391 (Figure 2) is provided with a downturned end 392 that is disposed in the slot 380 and is shiftable alternately into the slots 383 and 384 for controlling the marker latches. The rod 391 extends forwardly from the bracket 341 and is curved, as at 394, and passes through an opening 395 formed in the upper flattened end 396 of the swingable lifting lever 225 (Figure 2), the curved portion 394 being generally arcuate about the axis 231 of the lever 225. The forward end of the rod 391 is threaded and receives a pair of lock nuts 397 which serves as a stop by which the movement of the lever 225, after the end 396 engages the locknut 397, actuates the rod 391. At the end of the curved section 394 the rod 391 is provided with an abrupt bend 398 which serves as a stop or abutment by which at the other end of its range of movement the lever 225 may shift the rod 391.

The operation of the swingably mounted lifting lever 225 raises and lowers the planter runners, raises and lowers the markers, and controls the marker arm engaging latches in the following manner:

Assuming that the planters have been lowered by the movement of the swinging lever 225 into its position shown in Figure 2, the lifting chains 245, 246 and 247, 248 will be slackened, which permits the runners to move downwardly, provided of course that the implement has first been moved forwardly to permit the crank 168 and 225 to move out of its dead-center relationship (Figure 5). The subsequent movement of the lever 225 back toward its position shown in Figure 2 then engages the abutment 398 on the actuating rod 391 and moves the end 392 into the slot 380 (dotted lines, Figure 10). In this position one of the marker arms will be in lowered position while the other will be in raised position, Figures 1 and 7 showing the right hand marker 290 lowered and the left hand marker 291 raised and locked in raised position (Figure 19). When the farmer reaches the end of the row, he will pull the trip lever 191 forwardly which actuates the clutch 164 and causes the crank 168 to swing from the position shown in Figure 2 into the position shown in Figure 5. This swings the lever 225 forwardly, thus exerting a pull on each of the chains 245, 246 and 247, 248, thus raising the planter runners. Also, the lowered marker arm will be raised since it is connected to the upper lifting chain 248 in the same manner that the chain 320 is connected to the lifting chain 246 (Figure 7). As the lever 225 then approaches its forward position (Figure 5) the end 396 will engage the lock nuts 397 and pull the actuating rod 391 forwardly. The rear end 392 of the actuating rod will then move forwardly from its dotted line position in Figure 8 past the nose 385 of the reversing swivel and into the slot 384. This movement of the end 392 causes it to engage the arm 358 of the cam member 346, and continued forward movement of the actuating rod 391 causes the end 392 to act on the arm 358 and swing the cam member 346 into the position shown in Figure 9. The movement of the cam member 346 from the position shown in Figure 8 to the position shown in Figure 9 performs three functions. First, the nose 365 (Figure 8) moves away from the curved end 343a of the pull lever 343 and eventually moves over into engagement with the curved end 338a of the lever 338 until finally when the end 392 of the pull rod 391 reaches the end of the slot 384 (Figure 9) the nose 365 will have swung around and then have forced the lever 338 to move in a counterclockwise direction from its position shown in Figure 8 to the position shown in Figure 9, exerting a pull on the left hand latch controlling rod 312. This will disengage the associated latch 303 from the marker arm bracket 298, but the marker arm 291 will not swing downwardly into operating position because the power lift mechanism is in its raised position which exerts a pull on the associated chains and thus hold both markers in raised position. The swinging movement of the cam member 346 from the position shown in Figure 8 to the position shown in Figure 9 swings the spring receiving end 367 past the line connecting the pivot 351 of the member 346 and the pivot axis 374, 375 of the reversing swivel, and as soon as the end 367 passes this line, the spring 368 snaps the reversing swivel 373 over into its other positon, Figure 9, in which the nose 385 nests in the recess 387. This is the second function of the cam member 346. The third function which occurs when the member 346 moves from the position shown in Figure 8 over into the position shown in Figure 9 is the releasing of the latch rod pull lever 343, which is effected by the shoulder 365 moving away from the curved end 343a (Figure 8), and this permits the spring of the associated latch at the right side of the machine to move into a position to engage the right hand marker arm and latch the same in raised position.

When the farmer is again ready to plant, he pulls the trip rope connected with the trip lever 191 which engages the clutch, and then when the machine begins to move forwardly the swingably mounted lever 225 swings rearwardly and releases the chains, thus permitting the planter runners to lower and also permits the left hand marker arm to lower, since its latch was pulled into released position by the movement of the cam member 346 from its position shown in Figure 8 to its position shown in Figure 9. As the member 225 is swinging rearwardly from its position shown in Figure 5 to its position shown in Figure 2, the end 398 engages the abutment 398 and moves the latch actuating rod 391 rearwardly. The rearward movement of this member causes the end 392 (Figure 9) to move rearwardly, snapping past the nose 385 of the reversing swivel 373. Now when the farmer again reaches the end of the row and actuates the power lift clutch mechanism to raise the tools, the forward swinging movement of the lever 225 will shift the rod 391 forwardly, but this time the end 392, which is in the position shown in dotted lines in Figure 10, will shift forwardly in the slot 380 (Figure 9) and will move past the reversing swivel 373 and into the slot 383. This movement will cause the end 392 to engage the arm 357 and swing the cam member 346 from the position shown in Figure 9 back to its position shown in Figure 8, this being the reverse of the operation described above. Thus, this time the latch for the right marker will be pulled into a position releasing the marker arm and the latch for the left hand marker arm will be permitted to engage the associated marker arm, whereupon when the planter is again started up and the planter runners lowered, the right hand marker will again be lowered while the left hand marker will be held in raised position.

The mechanism as just described therefore acts to automatically latch one marker in raised position and free the other marker to be lowered into operating position in alternate relation with respect to the raising and lowering of the tools. This saves the operator's time and makes it impossible for him to forget to drop the marker, since they are automatically controlled without any attention on his part whatsoever, other than to actuate the raising and lowering means for the tools.

The raising means for the planting units, according to the present invention, controls means other than the marker arms, namely, the seed selecting mechanism. Reference was made above to the means by which the drive from the ground wheels 19 and 20 is transmitted through a differential, which equalizes the draft on each ground wheel, to the gear case and associated mechanism which drives the drill shaft 45, the latter determining the rotation of the seed plates and the selection of seed thereby. Reference was also made to the check fork rocker shaft 65 and the self-interrupting clutch disposed in or alongside the gear case 50 and controlled by the clutch trip lever 51. Referring now more particularly to Figure 2, the check fork rocker shaft 65 carries a cam arm 401 which has a head 402 formed with a cam section 403 and a dwell section 404. The head 402 is provided with a tapped boss 405 that is adapted to carry a roller for use when planting in hills, as will be referred to below. The cam arm 401 is secured in any suitable manner to the rocker shaft 65 between the bearing support arm 71 (Figure 2) and the gear case 50 so that the cam section 403 is in a position to engage the roller 408 disposed on a stud 409 carried by the lower end of the clutch controlling lever 51. The upper end 411 of the latter is connected by a link 412 to one end of a spring 413, the other end of which is anchored to a bracket 414. The latter is fixed in any suitable manner to the gear case 50. The spring 413 biases the clutch controlling lever 51 for movement in a counterclockwise direction (Figure 2), which causes the clutch to be disengaged. When the check forks of the check heads 69 are in their forward position, the cam arm 401 is swung forwardly and downwardly so that the lower end of the dwell section 404 engages the adjacent portion of the front frame angle 6, and since the spring urges the lever 51 for movement in a direction which carries the roller 408 into engagement with the cam section 403, the angle 6 serves as a stop for the arm 401 and the arm 401 serves as a stop for the lever 51. The cam arm 401 includes a generally upwardly extending section 420 which has connected to it the rear end of a spring 421, the forward end of which is adjustably connected to a bracket 423 bolted, as at 424, to the forward side of the frame angle 6. Preferably, the bracket 423 is slotted and the connection between the bracket and the spring 421 consists of a link 426 (Figure 12) which has a number of lugs 427 thereon and a handle section 428. The link 426 may therefore be grasped and engaged with the bracket 423 in any one of several different positions, thus adjusting the tension in the spring 421. The cam arm extension 420 is provided with a laterally extending lug 431 and, as best shown in Figures 1 and 12, the rear end of the rod 412 that engages an aperture in the upper end of the clutch controlling lever 51 is extended laterally as at 432. For controlling the seeding mechanism from the generally longitudinally swingable lifting lever 225, the latter is apertured adjacent the pivot 231 to receive the laterally turned end 435 of a rod 436 that extends forwardly and passes through an opening 437 in the vertical flange of the frame angle 16, the forward end of the rod 436 being disposed alongside the clutch controlling lever 51. An arm 438 is adjustably disposed on the forward end of the rod 436 and is adapted to be fixed thereto in any one of several positions of adjustment by means of a set screw 439.

The seed selecting and associated mechanisms just described may be arranged optionally for check-rowing, drilling or planting in hills, and in the two latter operations the planting is automatically thrown in and out of operation by the rod 436 that is connected with the longitudinally swingable lifting lever 225. The control of the seeding mechanism by the lifting lever 225 is effected as follows:

When check-rowing, in which the entire control of the seeding means is performed by the check wire, the arm 438 is placed in the position shown in Figure 2, and then fixed in this position by tightening the set screw 439. In this position the arm 438 is out of the way and does not interfere with the check-rowing operation. Each time the check fork 58 encounters a button on the check wire, the rocker shaft 65 is rocked, and this causes the arm 401 to be swung upwardly and rearwardly. This rocking movement of the rocker shaft 65 opens the valves in the runner shanks 25 by the connecting rods 61 and associated parts. Also, as the arm 401 swings upwardly and rearwardly, the cam section 403 engages the roller 408 and imparts a clockwise rocking movement to the clutch mechanism 51. The clutch is thus engaged and serves to connect the seed plate advancing means, which includes the drill shaft 45, with the constantly rotating sprocket 157 (Figure 1) which is driven from the ground wheels at a selected rate of speed. If it is desired to drill, then it is necessary to hold the clutch 51 in engagement and the valves in the runner shanks 25 open when the implement is moving, but in drilling it is quite desirable to automatically start and stop the drilling operation when the planter runners are lowered and raised by the lifting mechanism. The connection between the seeding mechanism and the lifting lever 225 described above is adapted to effect this automatic control, which is done by loosening the set screw 439 and shifting the arm 438 forwardly and engaging it on the forward side of the roller 432 when the lifting lever 225 is in a raised position and the rocker shaft arm 401 in its lowered position, as shown in Figure 2. Then when the implement is started up and the power lift mechanism operated to swing the lever 225 rearwardly, this imparts rearward longitudinal movement to the rod 436 shifting it in that direction and causing the arm 438 to swing the cam arm 401 upwardly and rearwardly into the position shown in Figure 12. Not only does this open the valves, since it rocks the rock shaft 65, but also the upward movement of the head 403 of the cam arm 401 swings the clutch controlling lever 51 to engage the clutch and cause the drill shaft 45 to be continuously actuated. However, as soon as the tools are raised by swinging the lever 225 forwardly, the arm 438 on the rod 436 is shifted forwardly, which permits the spring 421 to swing the cam arm 401 downwardly and forwardly, thus closing the valves and disconnecting the clutch by permitting the clutch controlling lever 51 to be rocked in a counterclockwise direction (Figure 12) by the spring 413. In this way, therefore, by a simple rearrangement of one of the parts, the power lift mechanism of the present invention is admirably adapted to automatically start and stop the drilling operation simultaneously with the lowering and raising of the planting units.

By another simple adjustment of the connections between the power lift mechanism of the present invention and the seeding mechanism, an automatic control for planting in hills and for automatically starting and stopping the planting operation by the power lift is secured. To provide a hill drop, according to the present invention, I mount a striker or knocker 440 (Figure 14) on the central portion 47 of the drill shaft 45. The striker 440 consists of a hub 441 and two arms 442 and 443, generally disposed in diametrically opposite relation, as shown in Figure 13. The arm 443 is wider than the arm 442, and a set screw 446 is provided whereby the knocker 440 may be loosened relative to the shaft 47 and shifted to different positions thereon. In addition to the knocker 440, I provide a roller 449 mounted on a stud 450, the latter being adapted to be screwed into the tapped opening in the boss 405 on the cam arm 401. When the striker 440 is disposed on the drill shaft section 47 close to the cam arm 401, both arms 442 and 443 are adapted to engage the roller 449. If the knocker 440 is moved slightly away from the arm 401, as shown in dotted lines in Figure 14, then only the arm 443 will engage the roller 449. To plant in hills the arm 438 is adjusted along the rod 436 to a point near the forward end thereof and fixed thereto so that when the lifting lever 225 is in its lowered position, the arm 438 will be disposed in a position to engage the end 432 of the link 412 and will swing the clutch controlling lever 51 clockwise (Figure 13) into a position in which the clutch is engaged, thus driving the drill shaft continuously as long as the planting units are in lowered position. As the drill shaft section 47 rotates, the knocker 440 will rotate with it, bringing either one or both of the arms 442 and 443 into engagement with the roller 449 on the cam arm 401. Therefore, periodically the striker will engage the arm 401 and swing the same upwardly and rearwardly, thus rocking the rocker shaft 65 and periodically opening the valves in the runner shanks. The continuous rotation of the drill shaft causes a continuous movement of the seed plates, but since the valves in the runner shanks are opened only periodically, the seed is collected to form a hill and then deposited in a group, the spacing between adjacent groups depending upon the position of the striker 440 and the particular gear ratio at which the drill shaft is rotated. Since the rod 436 is shifted longitudinally with the longitudinal swinging movement of the lifting lever 225, it will be seen that the engagement and disengagement of the clutch 51 for planting in hills is effected automatically by the raising and lowering of the tools. Figure 13 shows the position of the parts when the planter runners are in operating position and the lifting lever 225 in the position shown in Figures 2 and 12.

Another function of the power lift mechanism, including the generally longitudinally swingable Whitworth quick return motion follower arm 225 is to automatically engage and disengage the driving means for the fertilizer distributing mechanism, and such means will now be described.

Referring first to Figure 1, a fertilizer container 450 is mounted in any suitable manner on the rear frame bar 7, preferably substantially directly above the rear end of the planting shoes, and a transverse shaft 451 extends from one side of the machine to the other for driving all of the fertilizer distributing means at the same time. The present invention is not concerned with the particular details of the fertilizer distributing mechanism, and hence the same is not described in detail. It will be understood that the rotation of the shaft 451 actuates the fertilizer distributing means and deposits fertilizer in or along the rows of planted seed in the usual manner. The shaft 451 is supported in any suitable manner from the rear frame angle 7 or from the fertilizer distributing units themselves, if desired, and the shaft 451 is driven from a sprocket 453 that is fixed to rotate with the sprocket 183 (Figure 2) that drives the power lift mechanism. To this end, a sprocket chain 455 is trained around the sprocket 453 and a sprocket 456 (Figure 16) mounted for rotation relative to the shaft 451, as by being disposed in a bearing bracket 458 fixed, as at 459, to the rear frame angle 7. The sprocket 456 is formed with a clutch section 461 having clutch teeth cooperating with a second clutch section 462 that is slidable but non-rotatable on the shaft 451. A spring 463 serves to urge the clutch section 462 into engagement with the driving clutch section 461. The slidable clutch section 462 is formed with a flange 466 against which a rockable clutch actuating member 467 is disposed. The latter is formed with a cam section 469 which is in engagement with a corresponding cam section 471 formed on the adjacent portion of the bracket 458. The latter also has a pair of notches 472 and 473, in either of which the end 474 of the cam lug 469 may be disposed. When the cam 469 is disposed against the cam section 471 in the position shown in Figure 16, the two clutch parts 461 and 462 are in engagement, and the drive is transmitted from the sprocket 453, the chain 455 and the sprocket 456 through the two clutch parts to the fertilizer drive shaft 451. If, however, the clutch controlling member 467 be rocked from the position shown in full lines in Figure 15 to the position shown in dotted lines, the cam sections 469 and 471 will cause an axial shifting movement of the member 467, carrying with it the clutch part 462 and disengaging the latter from the driving clutch part 461, thus disconnecting the drive to the fertilizer distributing means.

The clutch controlling member 467 is provided with a handle 478 so that the member may be manually controlled when desired. Preferably, however, the member 467 is connected so as to be operated by the crank 168 of the Whitworth quick return motion, and to this end the member 467 is provided with a flanged part 479 having a generally arcuate slot 481 formed therein, the slot having an enlargement 482 at one end and a radial slot extension 483 at the other end. An operating rod 485 is provided with a connecting casting 486 at its rear end, the rod 485 being threaded thereinto and the casting 486 having a lug 487 (Figure 16) that is adapted to be inserted through the opening 482 and then shifted into the slot extension 483, the lug having an enlarged head, as best shown in Figure 16. The forward end of the actuating rod 485 is bent laterally and then forwardly so as to be engageable in the aperture in a lug 491 formed on or carried by a swingable actuating lever 492 mounted for rocking movement on a pivot stud 493. The member 492 is of particular formation. The upper end extends forwardly, as at 495, so as to be in a position overlying the crank end of the member 168, as best shown in Figure 15. At the other side of the stud 493, the member 492 is formed with a curved section 496 which normally is disposed underneath the crank end of the member 168. Offset laterally inwardly from the plane of the main body of the member 492 is a lug 497 which is adapted to engage the flange of the frame angle 172 to limit the clockwise movement (Figure 15) of the actuating member 492, especially when the parts are free (Figure 17).

The operation of the fertilizer distributor control is as follows, referring to Figure 15. In this figure the lifting crank member 168 is shown in the position it occupies when the tools are lowered, and the fertilizer control lever 457 is shown in full lines in the position in which the fertilizer drive shaft 451 is connected with the driving mechanism. When the farmer reaches the end of the row and operates the lifting mechanism to raise the tools, the counterclockwise rotation of the member 168 (Figures 2 and 15), causes the member 492 to be swung from its full line position, Figure 15, into its dotted line position. This exerts a pull on the rod 485 and swings the fertilizer clutch control member 467 into its dotted line position, whereupon the cam members 469 and 471 (Figure 16) cause a separation of the clutch elements 461 and 462, thus disconnecting the fertilizer drive. It will be noted that it is the initial movement of the member 168 that effects a complete disconnection of the fertilizer drive, almost before the chains 245, 246 and 247, 248 have started to raise the planter shoes. When the fertilizer control member 467 is swung into its dotted line position, Figure 15, the end 474 (Figure 16) moves laterally outwardly along the cam section 471 until it engages in the first notch 472. Since the spring 463 constantly urges the fertilizer control member 467 to the right (Figure 16) the member 467 remains in this position so long as the tools are raised and the crank member 168 remains in the position shown in Figure 5. This holds the operating member 492 in substantially the position shown in dotted lines in Figure 15. When the farmer again starts to plant and lowers the tools by tripping the power lift mechanism, the crank 168 swings in a counterclockwise direction from the position shown in Figure 5 back to the position shown in Figures 2 and 15. As the crank member 168 approaches its lowered position, it engages the curved portion 496 of the member 492, which at this time is disposed in its dotted line position, Figure 15, and the completion of the movement of the crank member 168 results in forcing the member 492 to swing in a counterclockwise direction, thus forcibly shifting the fertilizer control member 467 from its dotted line position, Figure 15, back to its full line position, thus reengaging the fertilizer clutch. The advantage of disengaging the fertilizer clutch at the very first part of the raising movement of the lifting mechanism that a supply of fertilizer is cut off as early as possible after the planting has stopped. This prevents filling the fertilizer tubes with fertilizer which upon resumption of planting would then be deposited in an excessive amount.

Reference was made above to the possibility of manually controlling the member 467. This can be done at any time that the need for such control may arise. For example, by lifting the rod 485 so as to carry the pivot 487 (Figure 16) up out of the radial slot extension 483 and into the arcuate slot 481, the handle 478 may be grasped and the clutch manually disengaged by swinging the member 467 from its full line position to its dotted line position (Figure 15). Further, the fertilizer control may be entirely disabled, if desired, by lifting the rear end of the rod 485 into the arcuate slot 481 and then moving the member 467 a distance sufficient to carry the end 474 (Figure 16) into the second notch 473. This position is shown in full lines in Figure 17, and in this position the subsequent actuation of the power lift mechanism, which causes longitudinal shifting movement of the rod 485, will not engage or disengage the clutch since the member 467 is thus moved into a position in which the end 487 merely slides back and forth in the arcuate slot 481 when the lifting mechanism is actuated, but due to the fact that the member 467 is in such a position that the lug 480, cannot reengage in the slot extension 483, the oscillations of the member 492 are not effective so far as swinging the member 467 is concerned. When it is desired to reestablish the automatic control of the fertilizer means by the lifting means, all that it is necessary to do is to shift the member 467 from its full line position (Figure 17) into its dotted line position, whereupon the lug 487 will reengage the slot extension 483, thus reestablishing an operative connection between the power lift controlled member 492 and the fertilizer controlling member 467.

Check row planters are commonly provided with means for carrying a reel of check wire and with means for laying out the wire at the beginning of the planting operation and for reeling up the wire at the end. The present invention contemplates certain new and useful improvements in the reel mechanism, particularly adapted for use with the planter described above. Referring now to Figures 18, 22 and 23, a reel for check wire is indicated in its entirey by the reference numeral 500 and comprises a pair of reel heads 501 and 502 connected together by a drum section 503 (Figure 24). Each reel is mounted on a reel shaft 506 (Figures 1 and 18), and the latter is supported on the planter frame by means of a pair of yokes or standards 507 and 525. The standard 507 is best shown in Figure 22 and is bolted, as at 510, to the frame angle 14. The upper end of the standard 507 is apertured to receive a pivot 511 by which a yoke member 512 is mounted for rocking movement. The yoke member 512 is provided with an arcuate slot 513, and a clamping bolt 514 extends through the slot and the adjacent portion of the standard 507. A handle nut 515 is threaded onto the bolt 514 and serves when tightened to clamp the rockable yoke member 512 in position. The latter member is provided with a U-shaped yoke section 517 in which the laterally inner end of the shaft 506 is adapted to rest. The shaft 506 is square in cross section except that the ends are rounded, as at 521 and 522 (Figure 18). The end 522 is supported in the laterally outer yoke or standard 525 which is bolted, as at 526, to the outer frame bar 15. As best shown in Figure 18, the upper end of the bracket 525 is disposed laterally inwardly of the frame bar 15, and the upper end of the standard 525 is braced by a rod 529 which is bolted at its upper end, as at 530, to the standard 525 and at its lower end, as at 531, to the rocker shaft bearing member 71. A level wind device 533 is carried on arms 534 and 535. The rear end of the arm 534 is secured to the standard 507 by the bolt 514 which serves to clamp the yoke 512 in adjusted position. The rear end of the other arm 535 is connected to the bolt 530 that secures the upper end of the brace rod 529 to the standard 525. A spring 537 is riveted, as at 538, to the rear end of the arm 535 and is apertured, as at 539, to receive the outer end 522 of the shaft 506. A shoulder 541 (Figure 18) is formed on the reel shaft 506 just inside the outer standard 525, which prevents the shaft 506 from becoming displaced axially outwardly. The end 522 of the shaft 506, like the end 521, is disposed in an open end U-shaped slot so as to facilitate placing the reel and shaft in position on the standards 507 and 525 and lifting the reel therefrom. However, the spring 537 releasably engages the end 522 of the shaft 506 so as to prevent inadvertent displacement of the reel shaft. When it is desired to remove the reel, the spring 537 is first sprung outwardly so as to disengage it from the end 522. The spring 537, when engaged with the reel shaft 506, also serves as a brace for holding the level wind device 533 in proper position.

At the inner end the reel shaft 506 carries a sprocket 543 over which a chain 544 is trained. The chain 544 is also trained around a sprocket 545 that is fixed to the left end of the left countershaft section 134. The bearing support for the outer end of the countershaft is best shown in Figure 22 and comprises a bracket 547 and a bearing casting 548 bolted to the standard 507 and the bracket 547, as at 549 and 555. The bolt 555, as best shown in Figure 22, extends outwardly for a substantial distance, as will be referred to below.

The reel proper is mounted for rotation relative to the reel shaft 506 by friction means best shown in Figures 24 and 25. There is a friction unit at each end of the reel, and since the units are substantially identical, a description of one will suffice. Referring now to Figures 24 and 25, which shows the laterally outer friction unit, the reel head 502 is formed with a bearing member 560 which is riveted thereto. The bearing member 560 receives a bearing bushing 561 which has a square hole fitting the reel shaft 506, whereby the bushing 561 rotates with the reel shaft while the bearing member 560 rotates with the reel head. The outer face or end of the bushing 561 is flat, and receives a friction member 562 having diametrically opposite trunnions 563 (Figure 24). A yoke casting 566 is provided with arms 567 formed to engage the trunnions 563 and is apertured at its central portion to receive the head of a clamping bolt 568. The bolt extends outwardly of the reel, through an opening in the bearing member 560 and receives a spring 569 and an adjusting nut 571. The end of the yoke 566 opposite the arms 567 is formed, as at 572, to engage in an opening 573 in the reel head to serve as a fulcrum point whereby the spring 569 acts against the yoke 566 as a lever urging the friction member 562, which is held against rotation by the yoke 566, in engagement with the end of the bushing 561, which rotates with the shaft 506 relative to the reel.

When laying out the check wire at the beginning of the planting operation, the free end of the check wire is connected to an anchor stake and the machine then driven forwardly. During this operation it is desired to restrain the rotation of the reel as the machine travels, and to this end the construction described above has particular utility. Before starting to lay out the wire, the handle nut 515 is loosened and the yoke 512 swung into its dotted line position, the latter having a handle 575 to facilitate this operation. This lowers the end 541 of the reel shaft 506 and thus slackens the chain 544 enough to permit its removal from the driving sprocket 545. The chain 544 is then anchored to the extended end of the bolt 555, and next the yoke member 512 is rocked in a counterclockwise direction (Figure 22) to raise the end 521 of the reel shaft 506 to a slight extent, sufficient to tighten the chain 544, which is then in the position shown in dotted lines in Figure 22. With the yoke member 512 in this position, the handle nut 515 is tightened to fasten the parts firmly together. Since the sprocket 543 is non-rotatably engaged with the reel shaft 506, and since the chain 544 is anchored to a fixed part on the planter frame, the chain and sprocket serve as means preventing the rotation of the reel shaft. Therefore, when laying out the wire, the reel rotates under the control of the friction units, including the members 561, 562, at each end of the reel.

After the wire has been laid out and the planting completed, it is then necessary to reel up the wire. In order to do this, the handle nut 515 is loosened, and the yoke 512 rocked to permit the removal of the chain 544 from the bolt 555. Then the chain can be placed over the driving sprocket 545 and the yoke member 512 rocked to tighten the chain 544 in its new position, followed by the tightening of the handle nut 515 to hold the parts in position. The forward travel of the machine then causes the reel shaft to rotate, which rotates the reel itself through the friction units described above. After the wire has been reeled up, the yoke 512 is again loosened to remove the chain 544, thus disconnecting the reel shaft drive, after which the reel may be entirely removed, or it may be left in position, if desired, by anchoring the chain 544 to the bolt 555, as described above and as shown in dotted lines in Figure 22.

What I claim and desire to secure by Letters Patent is:

1. In a planter having planting means adapted to be raised and lowered and a pair of marker arms also adapted to be raised and lowered, a rotatable power driven member carried by the planter, a lever swingably mounted on said planter from one position to the other, a Whitworth quick return motion connecting said rotatable member with said lever whereby movement of the latter from one position to the other takes place at a relatively slow rate while movement from said other position to said one position is accelerated, connecting means between said lever and said planting means and marker arms whereby movement of said lever from said one position to the other at said slow rate of motion serves to raise both said planting means and said marker arms, latch means serving to hold said marker arms in elevated position independent of the position of said lever, and means controlled by the accelerated return of said lever to said one position for alternately releasing said latches, whereby one or the other of said marker arms is lowered when said planting means is lowered.

2. A planting implement comprising a planting means, mechanism for raising and lowering said planting means, a pair of markers, means actuated by said mechanism when raising said planting means for raising said markers, and means actuated by said mechanism when lowering said planting means for alternately lowering said markers.

3. In a planter comprising frame means and a pair of marker arms pivotally connected therewith, the combination of a latch for each marker for holding the same in inoperative position, and means on said frame movable through a plurality of positions successively for alternately releasing said latches.

4. In a planter having a pair of relatively movable marker arms, both of which are adapted to be raised into inoperative position and to be lowered alternately into operating position, a separate latch for each of said marker arms, and means including a part movable from a central position generally into either one or the other of two opposite positions to release one or the other of said latches from the associated marker arm to permit the latter to lower.

5. In a planter having a pair of relatively movable marker arms, both of which are adapted to be raised into inoperative position and to be lowered alternately into operating position, a separate latch for each of said marker arms, a part movable from a central position generally into either one or the other of two opposite positions to release one or the other of said latches from the associated marker arm to permit the latter to lower, and means for moving said part successively from said central position to one opposite latch releasing position and then back to a central position and into the other opposite latch releasing position.

6. In a planter, a pair of marker arms, a latch for each arm, a pair of relatively movable latch controlling members, the inner ends of which are disposed adjacent one another and the outer ends of which are connected, respectively, to said latches, a shiftable actuating member connected to engage one or the other of said controlling members, and means for shifting said actuating member so as to engage and shift one or the other of said controlling members and shift the associated latch and thus lower one or the other of said markers, alternately.

7. In a planter, planting means adapted to be raised and lowered into and out of transport position, lifting mechanism including an oscillatory part operatively connected with said planting means for raising and lowering the same, a pair of relatively movable marker arms, latch means for each arm for holding it in raised position, each of said latches being biased to move into a position to engage the associated arm, latch controlling means comprising a member swingable from one position to another, said member being adapted in either position to move one or the other of said latches against its bias into a released position, snap action means for holding said member in either of its positions, a support for said member including two slotted sections, an oscillatory member movable in said slotted sections, and means controlled by said snap action mechanism for guiding said oscillatory member first into one slotted section and then into the other, whereby oscillations of said oscillatory member serves to move said latch controlling member first into one position and then into the other, and means connecting said oscillatory member with the oscillatory part of said lifting mechanism whereby when said planting means is raised into transport position said marker arms are also raised into transport position and one or the other of said latch means.

8. In a planter, frame means, ground wheel means supporting said frame means, planting means including a furrow opener shiftable generally vertically into and out of ground engaging position, mechanism for raising said furrow opener out of its ground engaging position and including a driven part and a driving part movable into an irreversible substantially dead-center relationship when the furrow opener is in its raised position, means for connecting the driven part with the furrow opener, and means for connecting the ground wheel means with the driving part, whereby said furrow opener normally is lowered only when the planter is moving forwardly.

9. In a planter, frame means, ground wheel means supporting said frame means, planting means including a furrow opener shiftable generally vertically into and out of ground engaging position, an oscillatory arm operatively connected with said planting means for raising and lowering the same, a rotatable crank operatively connected with said arm for swinging the same to raise said planting means, said arm moving substantially into a relation with respect to said crank when the planting means is raised such that the arm cannot drive the crank, self-interrupting clutch means for driving said crank, means actuated from said ground wheel means for driving said clutch, and controlling means operable before the planter moves forwardly for conditioning said clutch means so that when the planter moves forwardly said crank is rotated to swing said oscillatory arm to lower said clamping means.

10. In a planter or the like, a lifting clutch comprising driving and driven parts, a clutch pawl biased to connect said parts, means including a trip arm for holding said pawl in disengaged position to disconnect said parts, and means responsive to movement of said trip arm out of position holding said pawl disengaged into a position releasing said pawl, so as to prevent a return of said trip arm to said disengaging position until the clutch has operated.

11. In an agricultural implement, a lifting clutch of the self-interrupting type adapted to raise tool means or the like into a raised position, said clutch mechanism comprising driving and driven parts mounted in coaxial relation, a clutch pawl pivotally mounted on one of said parts and engageable with the other for connecting said parts together in driving relation, a movable member operatively connected with said pawl for moving the same out of engagement with said other part and said member including at least one end extending outwardly of said one part, and a trip lever engageable with the extended end of said movable member for engaging the same to release said pawl from said other part and stop the rotation of said one part, said member being adapted to move into a position preventing the return of said trip lever until after the clutch has been driven for at least a part of a revolution.

12. In a planter, planting means, mechanism for raising the latter into inoperative position including a movable part movable from a given position when the planting means is in an operative position into a second position when the planting means is in an inoperative position, fertilizer distributing means, means for driving the latter including a clutch, and means disposed adjacent said movable part when it is in said given position and operative by the first part of its movement from said given position toward said second position for disengaging said clutch.

13. In a planter or the like, planting means including means adapted to be raised and lowered into and out of inoperative position, lifting means for raising said planting means and including a movable member, a valve controlling rocker shaft, a seed selecting drive clutch including a part movable from one position to the other for engaging and disengaging the clutch, means on said rocker shaft adapted to engage said movable part for operating said clutch, a generally longitudinally extending member connected at its rear end with said movable lifting member and disposed at its forward end adjacent said clutch operating part and said part operating means on said rocker shaft, and cooperating means on said longitudinally extending member and said rocker shaft and responsive to movement of said longitudinally extending member when said lifting member is moved into a position corresponding to the lowered position of said planting means for rocking said rock shaft to open said valve means and act through said clutch part operating means on the rocker shaft for shifting said clutch part into engaged position.

14. In a planter or the like including a seed valve controlling rocker shaft and a seed selecting drive shaft, a hill drop attachment comprising an arm adapted to be secured to said rocker shaft and having a lateral extension thereon, and a striker adapted to be secured to said seed selecting drive shaft and having diametrically disposed parts, one being wider than the other in an axial direction, said striker being adjustable axially along said seed selecting drive shaft in a position in which only said wide striker arm part will engage said rocker shaft arm extension and into a position in which both of said striker arm parts will engage said extension, whereby said striker arm may be used either as a single striker or a double striker.

15. In a multiple-row planter, laterally extending frame means, a plurality of planting units connected therewith and adjustable laterally thereof, each of said planting units including shiftable valve means and link means for shifting the valve means, a shaft having one or more sections of substantially constant polygonal cross section supported by said frame means, and an arm shiftably mounted on each section and connected with the associated link means, whereby operation of said shaft moves all of said valve means, each arm when loosened adapted to be shifted along said section to accommodate lateral adjustment of said unit relative to said frame means.

16. In a planter having laterally extending frame means, a plurality of planting units connected therewith and adjustable laterally thereof, and a shaft of substantially constant polygonal cross section, bearing means for supporting said shaft on said frame means comprising a bushing having a polygonal opening adapted to be disposed in any position on said shaft, a journal bearing receiving said bushing and adapted to be fixed to said frame means, said bushing and journal bearing having interlocking means to prevent relative displacement when relative movement occurs between said shaft and said bushing, and means carried by said journal bearing providing an annular substantially V-shaped lubricant reservoir adjacent each end of said bushing.

17. In a multiple row planter comprising a main frame, a plurality of planting units carried thereby for relative raising and lowering movement and adapted to be shifted laterally to vary the row spacing, valve means associated with each planting unit, power lift means for raising and lowering said units, and a check fork rocker shaft mounted for movement on said main frame, the combination of a pair of laterally spaced supporting means for said frame, each comprising a pair of spaced apart members, a member fixed thereto, a sleeve rotatable on said member, a wheel on said sleeve, and means fixing said wheel to said sleeve in axially adjusted position thereon, means for driving said power lift means from said sleeves, irrespective of the position of the wheels thereon, and means operatively connecting each of said valve means with said rocker shaft and accommodating lateral adjustment of said units relative to said main frame.

18. In a planter having a pair of marker arms adapted to be raised and lowered, a rotatable power driven member carried by the planter, a lever swingably mounted on said planter from one position to the other, a Whitworth quick return motion connecting said rotatable member with said lever whereby movement of the latter from one position to the other takes place at a relatively slow rate while movement from said other position to said one position is accelerated, connecting means between said lever and said marker arms whereby movement of said lever from said one position to the other at said slow rate of motion serves to raise said marker arms, latch means serving to hold said marker arms in elevated position independent of the position of said lever, and means controlled by the accelerated return of said lever to said one position for alternately releasing said latches.

19. A planting implement comprising a planting means, mechanism for raising and lowering said planting means, a pair of markers, and means actuated by said mechanism for alternately lowering said markers.

20. A planting implement comprising a planting means, mechanism for raising and lowering said planting means, a movably mounted marker, latch means for holding said marker out of ground engaging position, means actuated by said mechanism when raising said planting means for moving said marker into said position, and means actuated by said mechanism when lowering said planting means for releasing said latch means.

21. A planting implement comprising frame means, planting means movably connected therewith, a pair of markers pivotally connected with said frame, a pair of latches carried by said frame and adapted, respectively, to hold said markers in inoperative position, means for raising and lowering said planting means, and means operative adjacent the beginning of the lowering movement of said raising and lowering means for alternately releasing said latches.

22. In a planter having a pair of relatively movable marker arms, both of which are adapted to be raised into inoperative position and to be lowered alternately into operating position, a separate latch for each of said marker arms, a part movable from a central position generally into either one or the other of two opposite positions, and link means connected with each latch, one or the other of said link means being operated by movement of said part into either of its opposite positions so as to release one or the other of said latches from the associated marker arm to permit the latter to lower.

23. In a planter, a pair of relatively movable marker arm controlling members, the inner ends of which are disposed adjacent one another, a shiftable actuating member movable through either of two paths so as to engage one or the other of said members, means for shifting said actuating member so as to actuate one or the other of said controlling members and lower one or the other of said markers alternately, and means for controlling the path through which said actuating member is shifted.

24. In a planter, a pair of relatively movable marker arms, latch means for each arm for holding it in raised position, each of said latches being biased to move into a position to engage the associated arm, and latch controlling means comprising a member movable from one position to another, said member being adapted when moved to either position to move one or the other of said latches against its bias into a released position, a support for said member including two slotted sections for guiding said movable member into one or the other of said slotted sections, and an oscillatory member movable in said slotted section for guiding said oscillatory member first into one slotted section and then into the other.

25. A planter comprising means serving as a frame, ground wheels supporting the same, planting means adapted to be raised and lowered, a lifting clutch comprising driving and driven parts, a clutch pawl biased to connect said parts, means including a trip arm movable into one position for holding said pawl in disengaged position to disconnect said parts and movable into another position releasing said pawl, means connecting the driving part of said clutch with said ground wheels, means connecting the driven part of said clutch with said planting means, and biased means movable in response to movement of said trip arm out of a position holding said clutch pawl in disengaged position into a position releasing said pawl and connecting said driving and driven clutch parts into a position effective to prevent a return of said trip arm to said pawl holding position until the forward movement of the planter has acted through said ground wheels, said clutch and said crank to initiate the lowering movement of said planting means.

26. In an agricultural implement, a lifting clutch of the self-interrupting type adapted to raise tool means or the like into a raised position, said clutch mechanism comprising driving and driven parts, a clutch pawl pivotally mounted on one of said parts and engageable with the other for connecting said parts together in driving relation, a movable trip lever operatively connected with said pawl for moving the same out of engagement with said other part, said trip lever being movable from a first position holding said clutch pawl in disengaged position into a second position releasing said pawl and connecting said driving and driven clutch parts, and means responsive to movement of said trip lever out of said first position for preventing a return of said trip arm to said second position until the clutch has been driven for at least a part of a revolution.

27. Mechanism for controlling a clutch having a pair of parts, one adapted to be moved into and out of engagement with the other, comprising a member connected with said one part and movable into three positions, two of said positions corresponding to the engaged and disengaged positions of said clutch, a movable clutch-controlling part, a rod extending from said clutch-controlling part to said movable member, the latter having a slot formed therein with a notch at one end thereof, and means on said rod adapted to engage in said slot and notch, optionally, engagement in said notch serving to connect said clutch-controlling part and said movable member whereby movement of said part acts through said rod to move said movable member from one position to the other, thereby operating said clutch, said movable member being movable into a third position by disengaging said rod-carried means from said notch and disposing the same in said slot, so that when said movable member is in said third position said rod-carried means is movable idly in said slot, whereby movement of said clutch-controlling part is ineffective to move said movable member and operate said clutch, the latter being disengaged when said movable member is in said third position.

28. In a planter or the like, planting means including means adapted to be raised and lowered, valve means for controlling the deposition of seed by said planting means, and seed selecting mechanism, means to operate said seed selecting means including a clutch adapted to be engaged and disengaged, lifting mechanism to raise said planting means into inoperative position and to lower the same into operative position, and means controlled by said lifting mechanism for holding said valve means open and said clutch engaged when said planting means has been lowered into operating position and to disengage said clutch and close said valve means when said planting means has been raised into inoperative position.

29. In a planter or the like, planting means including means adapted to be raised and lowered, valve means for controlling the deposition of seed by said planting means, seed selecting mechanism, and means to operate said seed selecting means including a clutch adapted to be engaged and disengaged, lifting mechanism to raise said planting means into inoperative position and to lower the same into operative position, means controlled by said lifting mechanism for engaging said clutch and driving said seed selecting mechanism operating means, and means driven by the latter for periodically opening and closing said valve means.

CHARLES H. WHITE.